US010477376B2

(12) United States Patent
Abraham et al.

(10) Patent No.: US 10,477,376 B2
(45) Date of Patent: Nov. 12, 2019

(54) SYSTEMS AND METHODS FOR FORMATTING FRAMES IN NEIGHBORHOOD AWARE NETWORKS

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Ashish Kumar Shukla, Sunnyvale, CA (US); Guido Robert Frederiks, Aptos, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 14/105,088

(22) Filed: Dec. 12, 2013

(65) Prior Publication Data

US 2014/0198724 A1 Jul. 17, 2014

Related U.S. Application Data

(60) Provisional application No. 61/751,712, filed on Jan. 11, 2013, provisional application No. 61/757,451, (Continued)

(51) Int. Cl.
*H04W 8/00* (2009.01)
*H04W 76/10* (2018.01)
(Continued)

(52) U.S. Cl.
CPC ............ *H04W 8/005* (2013.01); *H04L 67/16* (2013.01); *H04W 48/18* (2013.01); *H04W 76/00* (2013.01);
(Continued)

(58) Field of Classification Search
None
See application file for complete search history.

(56) References Cited

U.S. PATENT DOCUMENTS

| 6,532,368 B1 | 3/2003 | Hild et al. |
| 8,203,984 B2 | 6/2012 | Gong et al. |
| | (Continued) | |

FOREIGN PATENT DOCUMENTS

| CN | 1801753 A | 7/2006 |
| CN | 101601229 A | 12/2009 |
| | (Continued) | |

OTHER PUBLICATIONS

Taiwan Search Report—TW102149087—TIPO—dated Apr. 9, 2015.
(Continued)

*Primary Examiner* — Hassan A Phillips
*Assistant Examiner* — Gautam Sharma
(74) *Attorney, Agent, or Firm* — Paradice and Li LLP/Qualcomm

(57) ABSTRACT

Systems and methods for formatting frames in neighborhood aware networks are described herein. One aspect of the subject matter described in the disclosure provides a method of communicating in a wireless neighborhood aware network (NAN). The method includes determining at least one connection setup information element indicating one or more connection parameters of the NAN. The method further includes determining at least one service identifier of the NAN. The method further includes generating a public action discovery frame comprising the at least one connection setup information element and the at least one service identifier. The method further includes transmitting, at a wireless device, the public action discovery frame.

28 Claims, 14 Drawing Sheets

Related U.S. Application Data filed on Jan. 28, 2013, provisional application No. 61/762,249, filed on Feb. 7, 2013, provisional application No. 61/799,651, filed on Mar. 15, 2013, provisional application No. 61/815,190, filed on Apr. 23, 2013.

(51) Int. Cl.

| | | |
|---|---|---|
| *H04W 48/18* | (2009.01) | |
| *H04W 76/00* | (2018.01) | |
| *H04L 29/08* | (2006.01) | |
| *H04W 84/18* | (2009.01) | |
| *H04W 4/70* | (2018.01) | |
| *H04W 4/80* | (2018.01) | |

(52) U.S. Cl.
CPC ........... *H04W 76/10* (2018.02); *H04W 84/18* (2013.01); *H04W 4/70* (2018.02); *H04W 4/80* (2018.02)

(56) References Cited

U.S. PATENT DOCUMENTS

| | | | |
|---|---|---|---|
| 2005/0025080 A1* | 2/2005 | Liu | H04W 52/0229 370/311 |
| 2006/0234742 A1* | 10/2006 | Kim | H04W 60/04 455/513 |
| 2006/0239265 A1* | 10/2006 | Son | H04W 76/002 370/390 |
| 2006/0239365 A1 | 10/2006 | Smallcomb et al. | |
| 2006/0285528 A1 | 12/2006 | Gao et al. | |
| 2007/0165589 A1 | 7/2007 | Sakoda | |
| 2007/0286136 A1 | 12/2007 | Rittle et al. | |
| 2007/0296136 A1 | 12/2007 | Fukusaka et al. | |
| 2008/0009294 A1* | 1/2008 | Cho | H04W 72/042 455/451 |
| 2008/0031208 A1* | 2/2008 | Abhishek | H04W 52/0225 370/338 |
| 2008/0031210 A1 | 2/2008 | Abhishek et al. | |
| 2008/0045210 A1 | 2/2008 | Kaaja et al. | |
| 2008/0102842 A1* | 5/2008 | Kim | H04W 48/08 455/442 |
| 2008/0311933 A1* | 12/2008 | Lim | H04W 68/02 455/458 |
| 2009/0103501 A1 | 4/2009 | Farrag et al. | |
| 2009/0327292 A1* | 12/2009 | Janssen | G06F 17/30371 |
| 2010/0170511 A1 | 7/2010 | Payne et al. | |
| 2010/0172275 A1 | 7/2010 | Wu et al. | |
| 2010/0214967 A1 | 8/2010 | Moelard et al. | |
| 2010/0315954 A1 | 12/2010 | Singh et al. | |
| 2011/0019551 A1 | 1/2011 | Adams et al. | |
| 2011/0103264 A1 | 5/2011 | Wentink | |
| 2011/0142014 A1 | 6/2011 | Banerjee et al. | |
| 2011/0149806 A1* | 6/2011 | Verma | H04L 12/2809 370/255 |
| 2011/0153773 A1 | 6/2011 | Vandwalle et al. | |
| 2011/0170465 A1 | 7/2011 | Tavildar et al. | |
| 2011/0170511 A1 | 7/2011 | Chen | |
| 2011/0310791 A1 | 12/2011 | Prakash et al. | |
| 2012/0243524 A1 | 9/2012 | Verma et al. | |
| 2013/0044640 A1 | 2/2013 | Yen et al. | |
| 2013/0132501 A1 | 5/2013 | Vandwalle et al. | |
| 2013/0177002 A1 | 7/2013 | Sun et al. | |
| 2013/0185373 A1 | 7/2013 | Vandwalle et al. | |
| 2013/0205012 A1 | 8/2013 | Lee et al. | |
| 2013/0227152 A1 | 8/2013 | Lee et al. | |
| 2013/0322297 A1 | 12/2013 | Dominguez | |
| 2014/0105131 A1 | 4/2014 | Chu et al. | |
| 2014/0112194 A1 | 4/2014 | Novlan et al. | |
| 2014/0148099 A1 | 5/2014 | Reunamaki et al. | |
| 2014/0198725 A1 | 7/2014 | Abraham et al. | |

FOREIGN PATENT DOCUMENTS

| | | |
|---|---|---|
| CN | 102281088 A | 12/2011 |
| CN | 102668510 A | 9/2012 |
| JP | 2005151213 A | 6/2005 |
| JP | 2009545924 A | 12/2009 |
| TW | 200908644 A | 2/2009 |
| TW | 201014396 A | 4/2010 |
| WO | WO-2011087639 A1 | 7/2011 |
| WO | WO-2011088115 A1 | 7/2011 |
| WO | WO-2011159093 A2 | 12/2011 |

OTHER PUBLICATIONS

Gupta V., et al., "Information Embedding in IEEE 802.11 Beacon Frame," National conference on communication technologies & its impact on next generation computing CTNGC, Proceedings published by International Journal of computer applications, Nov. 6, 2012, pp. 12-16, XP055119181, Retrieved from the Internet < URL: http://research.ijcaonline.org/ctngc/number3/ctngc1027.pdf>, [retrieved dated on May 21, 2014] the whole document.

International Search Report and Written Opinion—PCT/US2013/075844—ISA/EPO—dated May 21, 2014.

Ververidis C.N, et al., "Service discovery for mobile Ad Hoc networks, a survey of issues and techniques", IEEE Communications Surveys, IEEE, New York, NY, US, vol. 10, No. 3, Jul. 1, 2008 (Jul. 1, 2008), pp. 30-45, XP011234560, ISSN, 1553-877X, DOI, DOI,10.1109/COMST.2008.4625803 p. 34, left-hand column, paragraph 4—p. 36, left-hand column, paragraph 2.

Wi-Fi Alliance, "Wi-Fi Peer-to-Peer (P2P) Specification v1.2", Wi-Fi Peer-To-Peer (P2P) Specification V1.2, Wi-Fi Alliance, US, vol. V1.2, 2010, pp. 1-160, XP008165048, Retrieved from the Internet: URL:https://www.wi-fi.org/knowledge-center/published-specifications.

Abraham S., et al., "Short Beacon", IEEE 802.11-12/0129r1, Jan. 17, 2012 (Jan. 17, 2012), XP055167256, pp. 1-15, URL: https://mentor.ieee.org/802.11/dcn/12/11-12-0129-01-00ah-short-beacon.pptx.

\* cited by examiner

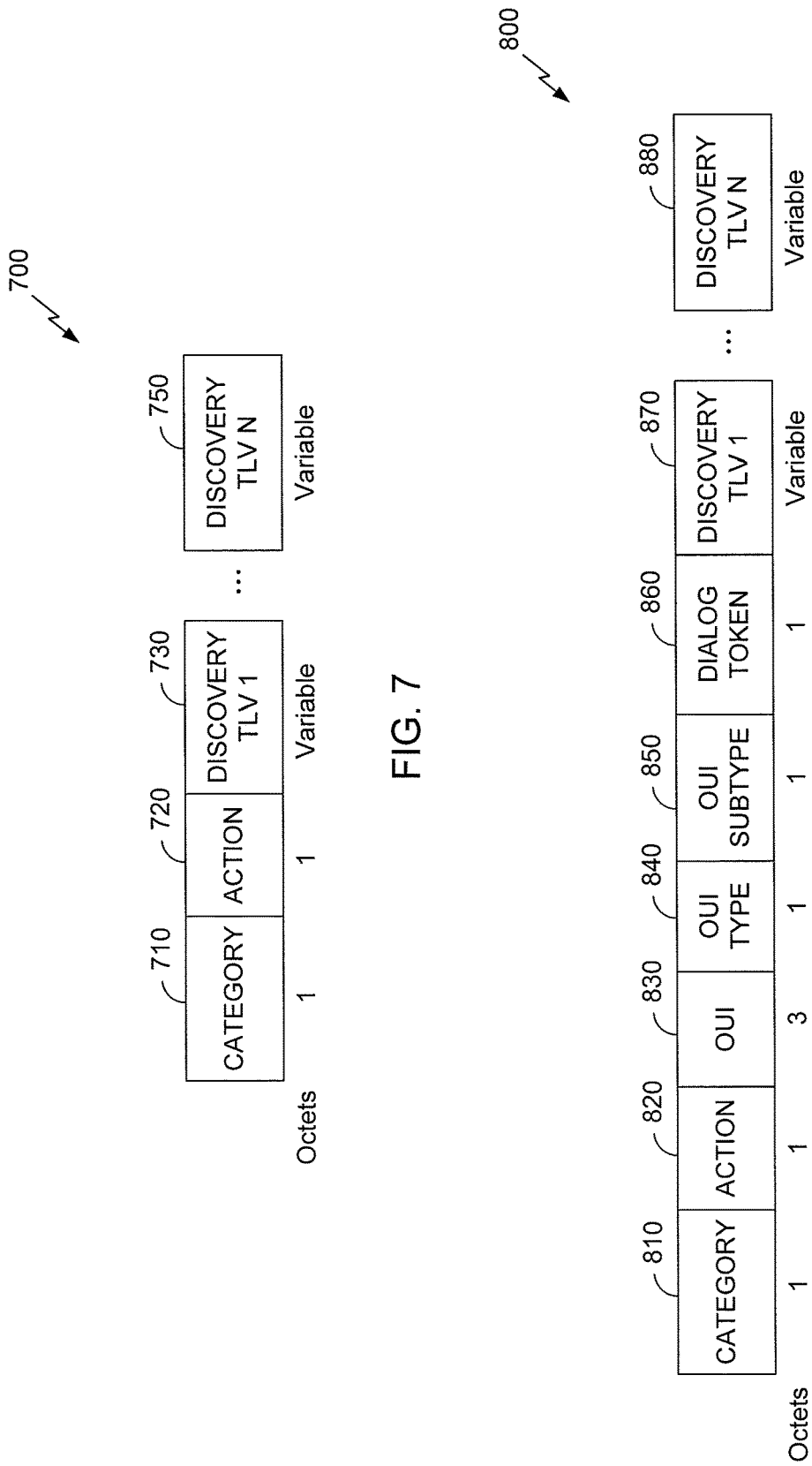

SYSTEMS AND METHODS FOR FORMATTING FRAMES IN NEIGHBORHOOD AWARE NETWORKS

CROSS-REFERENCE TO RELATED APPLICATIONS

This application claims the benefit of U.S. Provisional Patent Application No. 61/751,712, U.S. Provisional Patent Application No. 61/757,451, U.S. Provisional Patent Application No. 61/762,249, U.S. Provisional Patent Application No. 61/799,651, and U.S. Provisional Patent Application No. 61/815,190, which are all entitled "SYSTEMS AND METHODS FOR FORMATTING FRAMES IN NEIGHBORHOOD AWARE NETWORKS," and were filed on: Jan. 11, 2013; Jan. 28, 2013; Feb. 7, 2013; Mar. 15, 2013; and Apr. 23, 2013, respectively, the entirety of which are incorporated herein by reference.

TECHNICAL FIELD

The present application relates generally to wireless communications, and more specifically to a system and method for formatting frames in neighborhood aware networks.

BACKGROUND

In many telecommunication systems, communications networks are used to exchange messages among several interacting spatially-separated devices. Networks may be classified according to geographic scope, which may be, for example, a metropolitan area, a local area, or a personal area. Such networks may be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit/receive information between each other. The information may include packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

The devices may also broadcast discovery frames (e.g., public action discovery frames) or beacon signals to other nodes to help the nodes collect or provide information, synchronize timing, or provide other information or functionality. Discovery frames or beacons may therefore convey a large amount of data, some of which may be used by a given node. Accordingly, transmission of data in such discovery frames or beacons may be inefficient due to the fact that much of the bandwidth for transmitting discovery frames or beacons may be used to transmit data that will not be used. Thus, improved systems, methods, and devices for communicating packets are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the subject matter described in the disclosure provides a method of communicating in a wireless neighborhood aware network (NAN). The method comprises determining at least one connection setup information element indicating one or more connection parameters of the NAN. The method further comprises determining at least one service identifier of the NAN. The method further comprises generating a public action discovery frame comprising the at least one connection setup information element and the at least one service identifier. The method further comprises transmitting, at a wireless device, the public action discovery frame.

Another aspect of the subject matter described in the disclosure provides a wireless device configured to communicate in a wireless neighborhood aware network (NAN). The wireless devices includes a processor configured to determine at least one connection setup information element indicating one or more connection parameters of the NAN. The processor is further configured to determine at least one service identifier of the NAN. The processor is further configured to generate a public action discovery frame comprising the at least one connection setup information element and the at least one service identifier. The processor is further configured to transmit, at a wireless device, the public action discovery frame.

Another aspect of the subject matter described in the disclosure provides an apparatus for communicating in a wireless neighborhood aware network (NAN). The apparatus comprises means for determining at least one connection setup information element indicating one or more connection parameters of the NAN. The apparatus further comprises means for determining at least one service identifier of the NAN. The apparatus further comprises means for generating a public action discovery frame comprising the at least one connection setup information element and the at least one service identifier. The apparatus further comprises means for transmitting, at a wireless device, the public action discovery frame.

Another aspect of the subject matter described in the disclosure provides a non-transitory computer-readable medium including code that, when executed, causes an apparatus to determine at least one connection setup information element indicating one or more connection parameters of the NAN. The medium further includes code that, when executed, causes the apparatus to determine at least one service identifier of the NAN. The medium further includes code that, when executed, causes the apparatus to generate a public action discovery frame comprising the at least one connection setup information element and the at least one service identifier. The medium further includes code that, when executed, causes the apparatus to transmit, at a wireless device, the public action discovery frame.

BRIEF DESCRIPTION OF THE DRAWINGS

FIG. 7 illustrates an example neighborhood aware network discovery frame.

FIG. 8 illustrates an example vendor-specific discovery frame.

DETAILED DESCRIPTION

Figure 1:
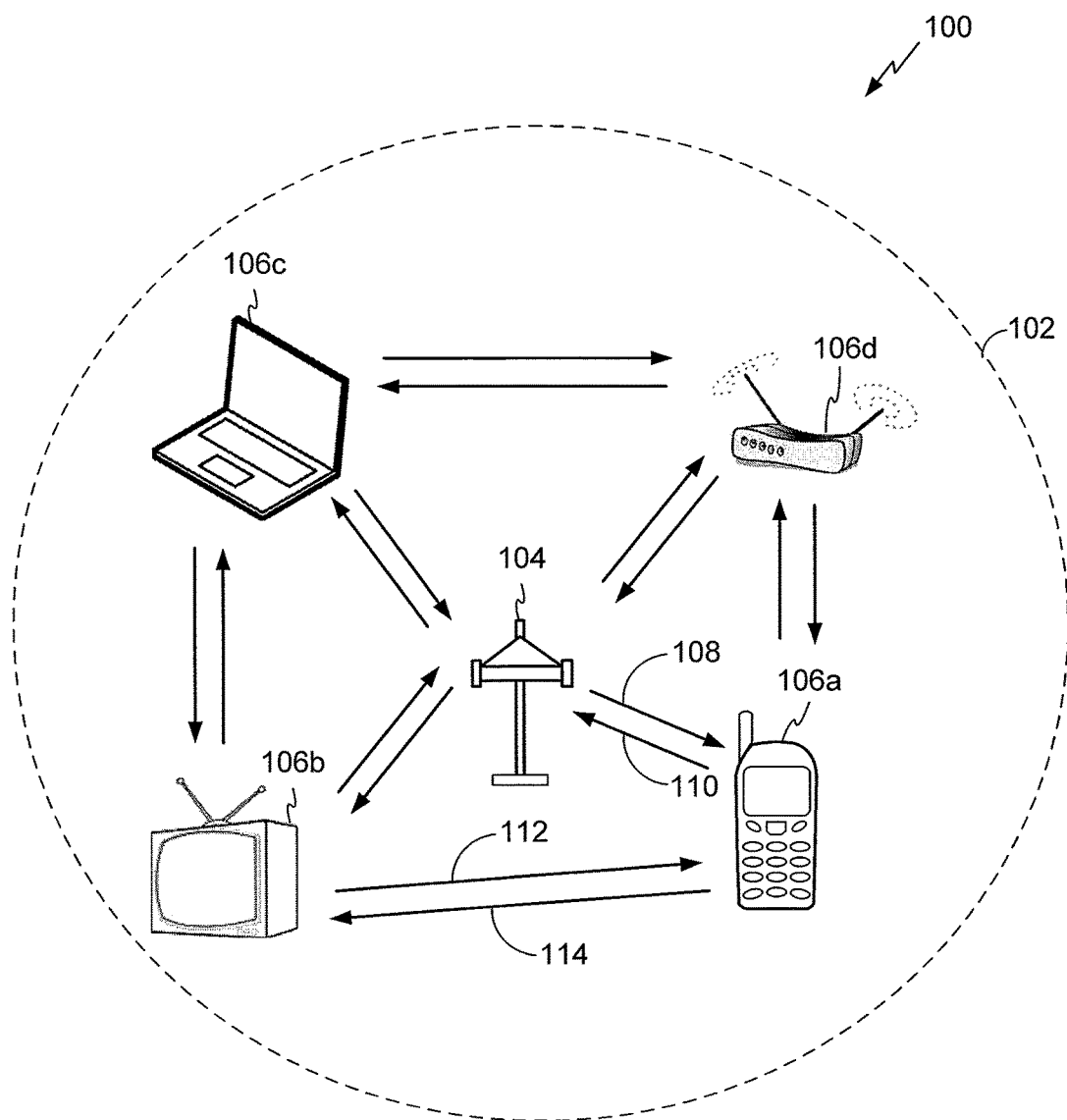
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and may not be construed as limited to any specific structure or function presented throughout this disclosure. Rather, these aspects are provided so that this disclosure will be thorough and complete, and will fully convey the scope of the disclosure to those skilled in the art. The scope of the disclosure covers any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention covers such an apparatus or method which is practiced using other structure, functionality, or structure and functionality in addition to or other than the various aspects of the invention set forth herein. Any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations, for example, may be used for neighborhood aware networking (NAN), or social-WiFi networking. For example, various stations within the network may communicate on a device to device (e.g., peer-to-peer communications) basis with one another regarding applications that each of the stations supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. A discovery packet may also be referred to as a discovery message or a discovery frame. A paging or query packet may also be referred to as a paging or query message or a paging or query frame.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs, such as during social-WiFi networking. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). The wireless communication system 100 may not have a central AP 104, but rather may function as a peer-to-peer network between the STAs 106. Accordingly, the functions of the AP 104 described herein may alternatively be performed by one or more of the STAs 106.

Figure 2:
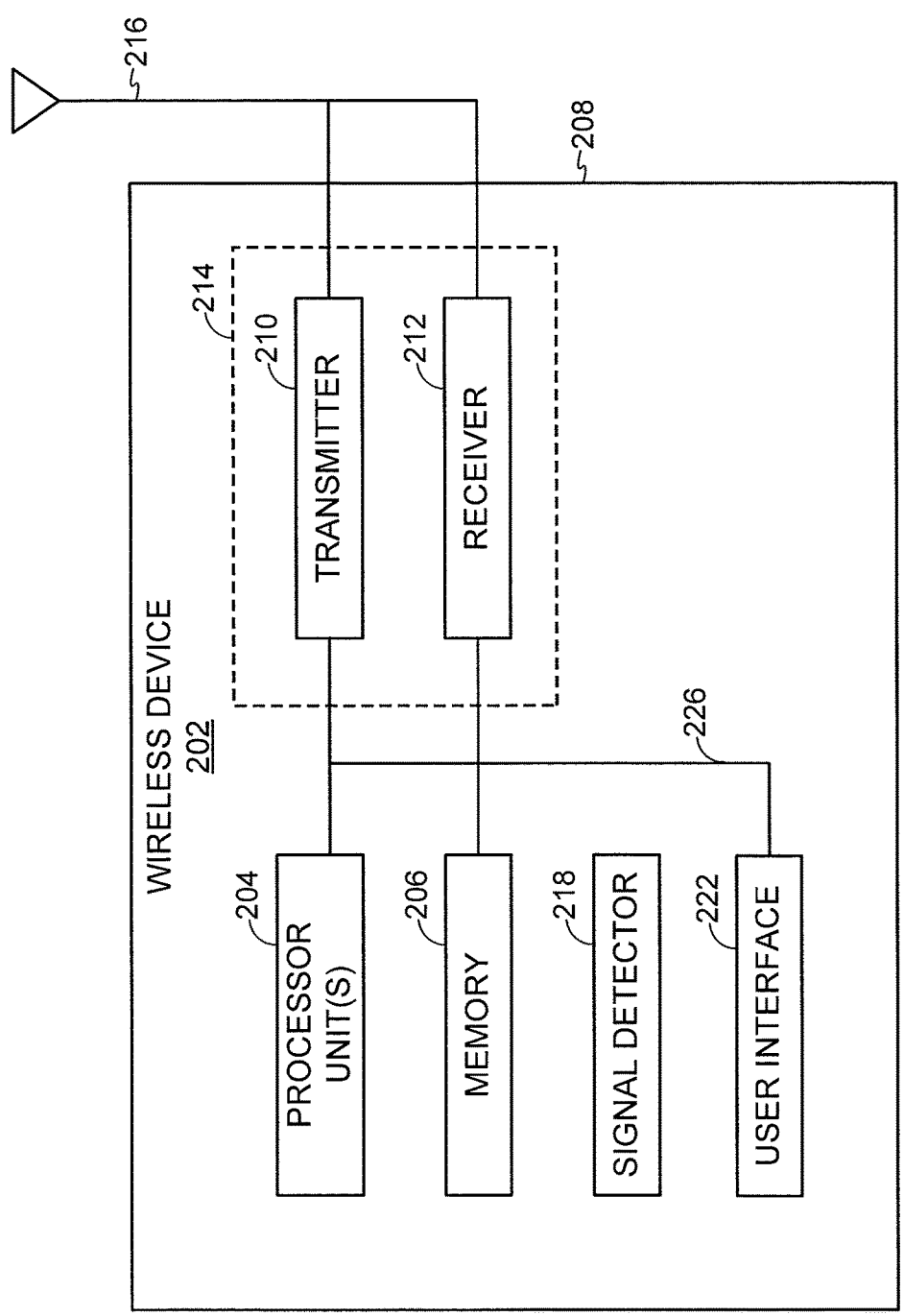
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 may performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

To ensure proper communication between devices such as AP 104 and the STAs 106 or between multiple STAs 106, the AP 104 or STAs 106 may receive information regarding characteristics of the AP 104 or STAs 106. For example, the STA 106 may use timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may generally be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3:
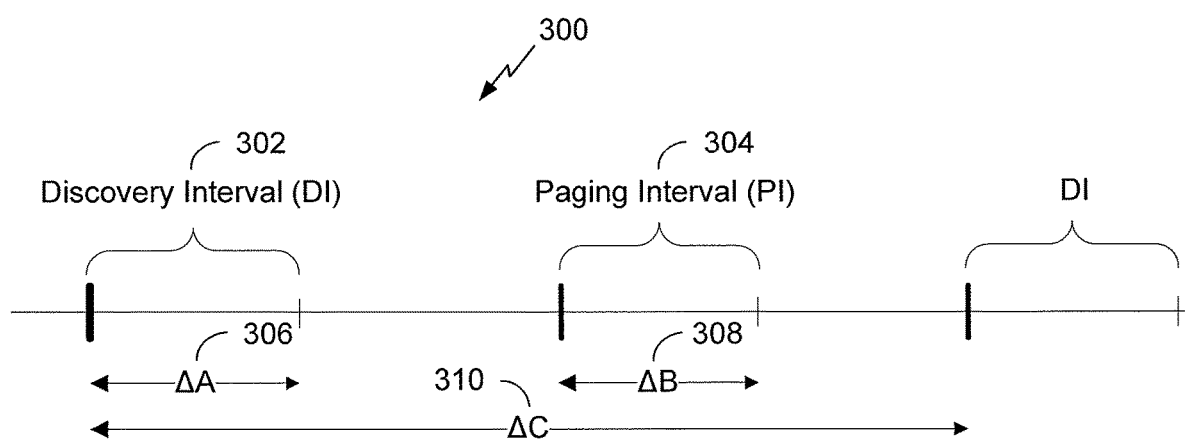
FIG. 3 illustrates an exemplary communication timeline in a wireless communication system in accordance with aspects of the present disclosure.

FIG. 3 illustrates an exemplary communication timeline 300 in a wireless communication system where devices may communicate via one channel. The exemplary communication timeline 300 may include a discovery interval (DI) 302 of a time duration $\Delta A$ 306, a paging interval (PI) 304 of a time duration $\Delta B$ 308, and an overall interval of a time duration $\Delta C$ 310. In some aspects, communications may occur via other channels as well. Time increases horizontally across the page over the time axis.

During the DI 302, APs or STAs may advertise services through broadcast messages such as discovery packets. In some embodiments, the DI 302 may be referred to as a discovery window (DW). APs or STAs may listen to broadcast messages transmitted by other APs or STAs. In some aspects, the duration of DIs may vary over time. In other aspects, the duration of the DI may remain fixed over a period of time. The end of the DI 302 may be separated from the beginning of the subsequent PI 304 by a first remainder period of time as illustrated in FIG. 3. The end of the PI 304 may be separated from the beginning of a subsequent DI by a different remainder period of time as illustrated in FIG. 3.

During the PI 304, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration $\Delta C$ 310 may measure the period of time from the beginning of one DI to the beginning of a subsequent DI as illustrated in FIG. 3. In some embodiments, the duration $\Delta C$ 310 may be referred to as a discovery period (DP). In some aspects, the duration of the overall interval may vary over time. In other aspects, the duration of the overall interval may remain constant over a period of time. At the conclusion of the overall interval of duration $\Delta C$ 310, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information, generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration ΔC of the overall interval may equal approximately one to five seconds in some aspects. In other aspects, the overall interval may be less than one second or more than five seconds. The duration ΔA of the DI may equal approximately 16 ms in some aspects while more or less than 16 ms in other aspects. The duration ΔB of the PI may equal approximately the duration ΔA in some aspects. In other aspects, the duration ΔB may be more or less than the duration ΔA.

Figure 4:
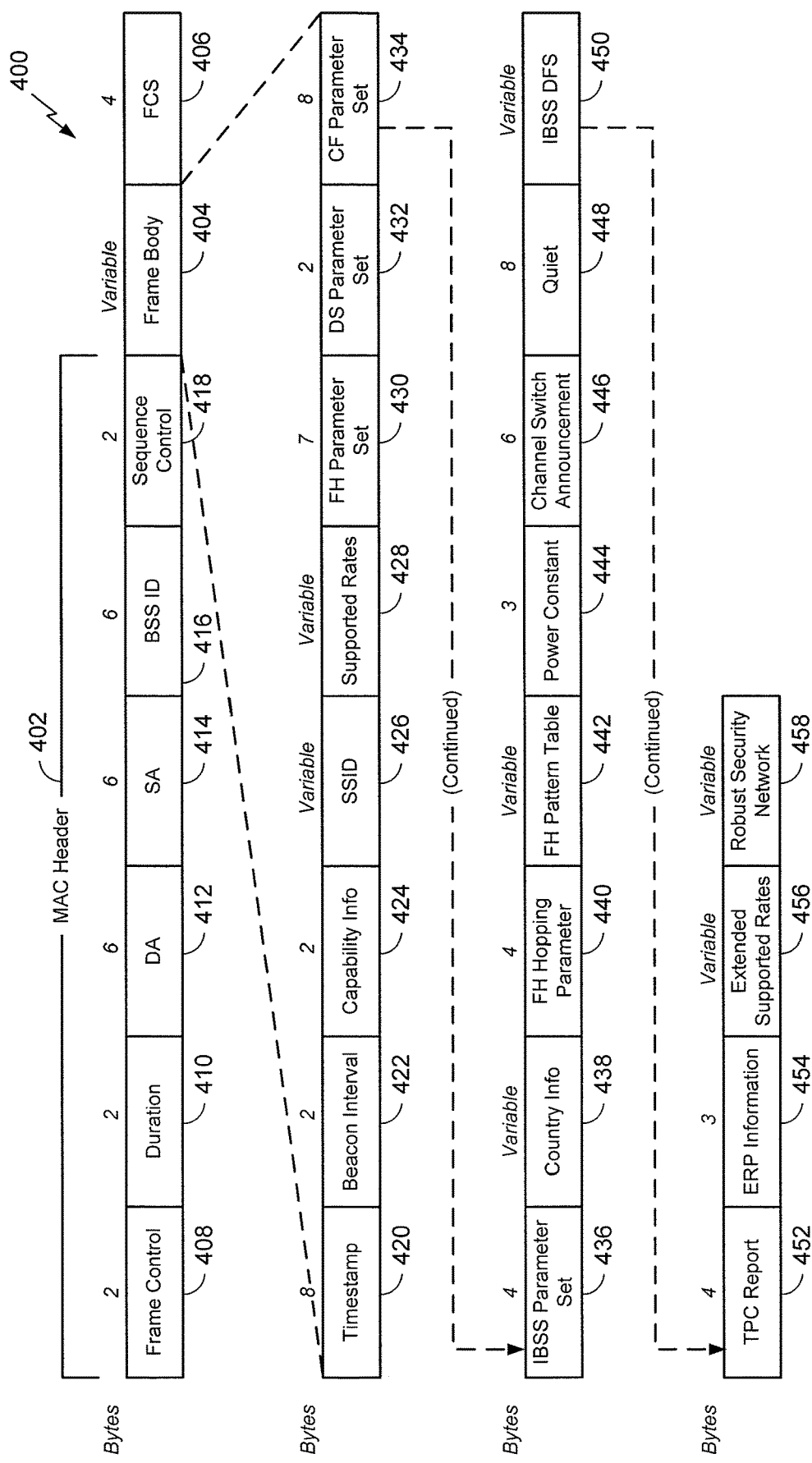
FIG. 4 illustrates an example of a beacon frame used in legacy systems for communication.

FIG. 4 illustrates an example of a beacon frame 400 used in legacy systems for communication. As shown, the beacon 400 includes a median access control (MAC) header 402, a frame body 404, and a frame control sequence (FCS) 406. As shown, the MAC header 402 is 24 bytes long, the frame body 404 is of variable length, and the FCS 406 is four bytes long.

The MAC header 402 serves to provide basic routing information for the beacon frame 400. In the illustrated embodiment, the MAC header 402 includes a frame control (FC) field 408, a duration field 410, a destination address (DA) field 412, a source address (SA) field 414, a basic service set identification (BSSID) field 416, and a sequence control field 418. As shown, the FC field 408 is two bytes long, the duration field 410 is two bytes long, the DA field 412 is six bytes long, the SA field 414 is six bytes long, the BSSID field 416 is six bytes long, and the sequence control field 418 is two bytes long.

The frame body 404 serves to provide detailed information about the transmitting node. In the illustrated embodiment, the frame body 404 includes a timestamp field 420, a beacon interval field 422, a capability information field 424, a service set identifier (SSID) field 426, a supported rates field 428, a frequency-hopping (FH) parameter set 430, a direct-sequence parameter set 432, a contention-free parameter set 434, an independent basic service set (IBSS) parameter set 436, a country information field 438, a FH hopping parameter field 440, a FH pattern table 442, a power constraint field 444, a channel switch announcement field 446, a quiet field 448, a IBSS direct frequency selection (DFS) field 450, a transmit power control (TPC) field 452, an effective radiated power (ERP) information field 454, an extended supported rates field 456, and a robust security network (RSN) field 458.

As shown in FIG. 4, the timestamp field 420 is eight bytes long, the beacon interval field 422 is two bytes long, the capability information field 424 is two bytes long, the service set identifier (SSID) field 426 is a variable length, the supported rates field 428 is a variable length, the frequency-hopping (FH) parameter set 430 is seven bytes long, the direct-sequence parameter set 432 is two bytes long, the contention-free parameter set 434 is eight bytes long, an independent basic service set (IBSS) parameter set 436 is 4 bytes long, the country information field 438 is a variable length, the FH hopping parameter field 440 is four bytes long, the FH pattern table 442 is a variable length, the power constraint field 444 is three bytes long, the channel switch announcement field 446 is six bytes long, the quiet field 448 is eight bytes long, the IBSS direct frequency selection (DFS) field 450 is a variable length, the transmit power control (TPC) field 452 is four bytes long, an effective radiated power (ERP) information field 454 is three bytes long, an extended supported rates field 456 is a variable length, and the robust security network (RSN) field 458 is a variable length.

Referring still to FIG. 4, although the beacon frame 400 is a variable length, it is generally at least 89 bytes long. In various radio environments, much of the information contained in the beacon frame 400 may be used infrequently or not at all. Accordingly, in low-power radio environments, it may be desirable to reduce the length of the beacon frame 400 in order to reduce power consumption. Moreover, some radio environments use low data rates. For example an access point implementing an 802.11ah standard may take a relatively long time to transmit the beacon frame 400 due to relatively slow data transmission rates. Accordingly, it may be desirable to reduce the length of the beacon frame 400 in order to shorten the amount of time it takes to transmit the beacon frame 400.

Figure 5:
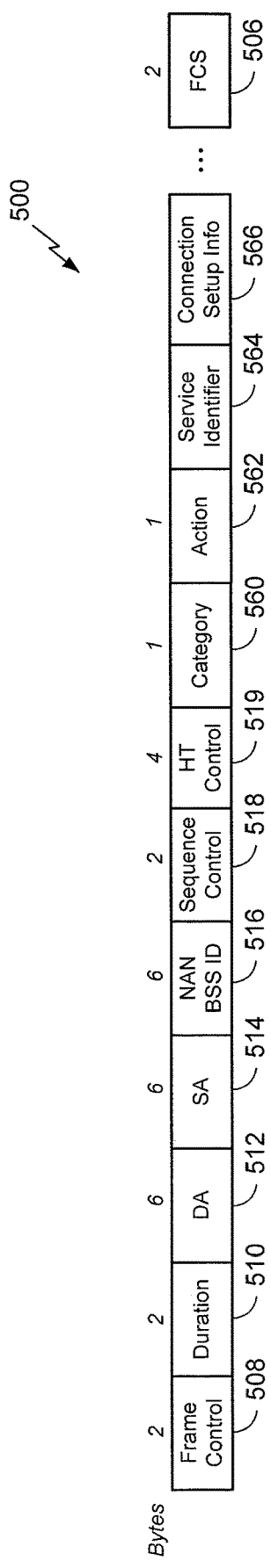
FIG. 5 illustrates an example neighborhood aware network discovery frame.

FIG. 5 illustrates an example neighborhood aware network discovery frame 500. In the illustrated embodiment, the NAN discovery frame 500 includes a frame control (FC) field 508, a duration field 510, a destination address (DA) field 512, a source address (SA) field 514, a NAN BSSID field 516, a sequence control field 518, a high-throughput (HT) control field 519, a category field 560, and action field 562, a service identifier 564, a connection setup information field 566, and a frame check sequence (FCS) 506. As shown, the frame control (FC) field 508 is 2 bytes long, the duration field 510 is 2 bytes long, the destination address (DA) field 512 is 6 bytes long, the source address (SA) field 514 is 6 bytes long, the NAN BSSID field 516 is 6 bytes long, the sequence control field 518 is 2 bytes long, the high-throughput (HT) control field 519 is 4 bytes long, the category field 560 is 1 byte long, the action field 562 is 1 byte long, and the frame check sequence (FCS) 506 is 4 bytes long. In various embodiments, the NAN discovery frame 500 may omit one or more fields shown in FIG. 5 and/or include one or more fields not shown in FIG. 5, including any of the fields discussed herein. The fields in the NAN discovery frame 500 may be of different suitable lengths, and may be in a different order.

In various embodiments, one or more of the frame control (FC) field 508, the duration field 510, the destination address (DA) field 512, the source address (SA) field 514, the sequence control field 518, the timestamp 720, and the frame check sequence (FCS) 506 may include the frame control (FC) field 408, the duration field 410, the destination address (DA) field 412, the source address (SA) field 414, the sequence control field 418, the timestamp 420, and the frame check sequence (FCS) 406 described above with respect to FIG. 4, respectively. Accordingly, the frame control (FC) field 508, the duration field 510, the destination address (DA) field 512, the source address (SA) field 514, the NAN BSSID field 516, and the sequence control field 518 may be configured to have the same format as a legacy MAC header, such as the MAC header 402 of FIG. 4. The NAN discovery frame 500 may be formatted for processing by legacy hardware, without modification.

In some embodiments, the destination address field 512 may have the same format as the destination address field 412 described above with respect to FIG. 4, but may be interpreted differently. In some embodiments, the destination address field 512 may be set to the same value as the NAN BSSID field 516, described in greater detail below. In some embodiments, certain devices in the network are configured to ignore, drop, or stop decoding packets based on filtering of the destination address field 512. In an embodiment, when the destination address field 512 is set to the NAN BSSID, the devices may be configured to read the entire discovery frame 500. In an embodiment, a device receiving the discovery frame 500 may determine whether it is being addressed based on a requestor address field, as will be described in greater detail herein with respect to FIG. 13.

In some embodiments, the NAN BSSID field 516 may have the same format as the BSSID field 416 described above with respect to FIG. 4, but may be interpreted differently. In some embodiments, the DA field 512 may be set to a broadcast address, and the SA field 514 may be set to a sender address.

In another embodiment, each NAN may have a different (for example, pseudorandom) NAN BSSID. In an embodiment, the NAN BSSID may be based on a service application. For example, a NAN created by Application A may have a BSSID based on an identifier of Application A. In some embodiments, the NAN BSSID 516 may be defined by a standards-body. In some embodiments, the NAN BSSID 516 may be based on other contextual information and/or device characteristics such as, for example, a device location, a server-assigned ID, etc. In one example, the NAN BSSID 516 may include a hash of the latitude and longitude location of the NAN.

In an embodiment, the frame control field 508 may include a type indicator. The FC 508 type indicator may indicate that the NAN discovery 500 is a management frame. In various embodiments, the NAN discovery frame 500 may be a public action frame. The service identifier 564, connection setup information 566, and/or additional NAN information may be carried as information elements in the public action frame. In an embodiment, a STA 106 (FIG. 1) may set the type indicator to a public action frame.

In an embodiment, the service identifier 564 may indicate service information for the NAN discovery frame 500. In an embodiment, the SA field 514 may include a device identifier of a transmitting device. In an embodiment, the connection setup information field 566 may include information indicating one or more connection parameters such as, for example, use of WiFi direct for connection establishment.

Figure 6:
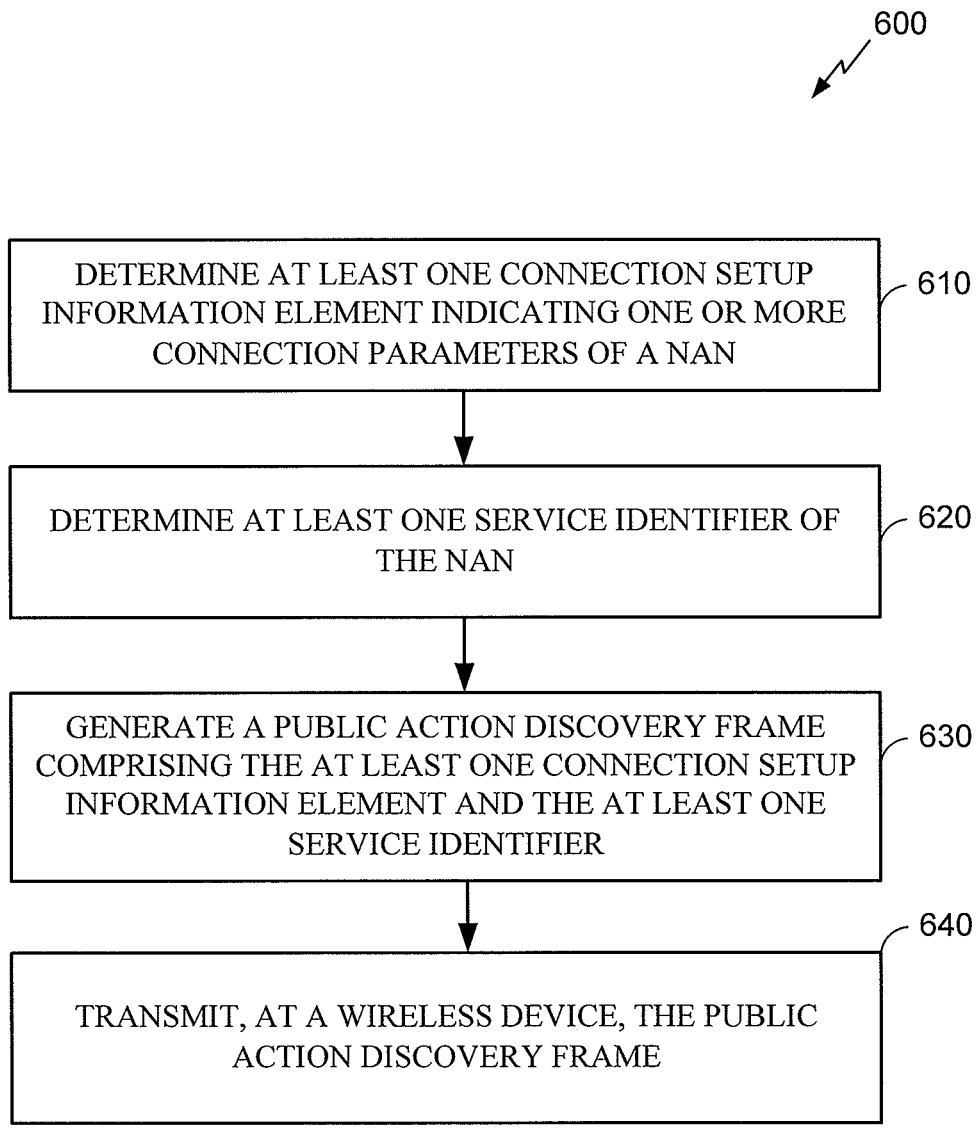
FIG. 6 shows a flowchart for another exemplary method of wireless communication that may be employed within the wireless communication system of FIG. 1.

FIG. 6 shows a flowchart 600 for another exemplary method of wireless communication that may be employed within the wireless communication system 100 of FIG. 1. The method may be implemented in whole or in part by the devices described herein, such as the wireless device 202 shown in FIG. 2. Although the illustrated method is described herein with reference to the wireless communication system 100 discussed above with respect to FIG. 1, and the wireless device 202 discussed above with respect to FIG. 2, The illustrated method may be implemented by another device described herein, or any other suitable device. Although the illustrated method is described herein with reference to a particular order, in various embodiments, blocks herein may be performed in a different order, or omitted, and additional blocks may be added.

First, at block 610, the device 202 determines at least one connection setup information element indicating one or more connection parameters of the NAN. For example, the STA 106*a* may determine connection setup information elements for the communication network 100. In an embodiment, connection setup information may include, for example, an indication that WiFi Direct may be used. In an embodiment, the processor 204 may encode the connection setup information in the connection setup information field 566 (FIG. 5) of the discovery frame 500 (FIG. 5). In some embodiments, connection setup information elements may include one or more fields of a discovery type length value (TLV), described below with respect to FIG. 9.

Next, at block 620, the device 202 determines at least one service identifier of the NAN. For example, the STA 106*a* may determine service information for the communication network 100. In an embodiment, the processor 204 may encode the service identifier in the service identifier field 564 (FIG. 5) of the discovery frame 500 (FIG. 5).

Then, at block 630, the device 202 generates a public action discovery frame comprising the at least one connection setup information element and the at least one service identifier. For example, the STA 106*a* may generate the public action discovery frame 500 (FIG. 5) including the connection setup information field 566 (FIG. 5) and the service identifier field 564 (FIG. 5).

In some embodiments, the public action discovery frame includes one or more discovery type length values (TLVs). For example, the STA 106*a* may generate the discovery frame 700 and/or 1500, described in greater detail below with respect to FIGS. 7-15. In some embodiments, each discovery TLV may include the discovery TLV 1600 and/or 1100, described in greater detail below with respect to FIGS. 16 and 11.

In various embodiments, each discovery TLV may include the connection setup information and the service identifier. In various embodiments, each discovery TLV may include the service identifier, a length field, a service control field, a range control field, ranging information, and a service-specific information container. Each discovery TLV may include a service control field comprising a publish flag, a subscribe flag, a secure flag, and a range limited flag. Each discovery TLV may include a ranging control field comprising a ranging information length, and/or a ranging algorithm type. In some embodiments, the service identifier may include all-ones or all-zeroes and may indicate a NAN management operation.

In various embodiments, one or more fields described herein with respect to the discovery TLV may be included in an attribute of an information element. For example, For example, the STA 106a may transmit the information element 1000 and/or 1200, described in greater detail below with respect to FIGS. 10 and 12. In some embodiments, the information element may be a peer-to-peer (P2P) and/or vendor-specific information element.

In some embodiments, the discovery frame further includes a frame control field, a duration field, a destination address, a source address, a NAN BSSID, a sequence control field, a high throughput control field, a category field, an action field, and a frame check. In various embodiments, the frame control field may include 2 bytes, the duration field may include 2 bytes, the destination address may include 6 bytes, the source address may include 6 bytes, NAN BSSID may include 6 bytes, the sequence control field may include 2 bytes, the high throughput control field may include 4 bytes, the category field may include 1 byte, the action field may include 1 byte, and the frame check may include 4 bytes. For example, the discovery frame may be the discovery frame 500 described above with respect to FIG. 5, which may include the frame control (FC) field 508, the duration field 510, the destination address (DA) field 512, the source address (SA) field 514, the NAN BSSID field 516, the sequence control field 518, the high-throughput (HT) control field 519, the category field 560, and action field 562, the service identifier 564, a connection setup information field 566, and the frame check sequence (FCS) 506. In an embodiment, the source address includes an identifier of the wireless device 202.

Thereafter, at block 640, the wireless device 202 transmits the public action discovery frame. For example, the STA 106a may transmit the public action discovery frame 500 (FIG. 5). In some embodiments, the transmitter 210 may transmit the public action discovery frame. In an embodiment, the STA 106a transmits the discovery frame 500 during the discovery window 302.

In an embodiment, the method shown in FIG. 6 may be implemented in a wireless device that may include a determining circuit, a generating circuit, and a transmitting circuit. A wireless device may have more components than the simplified wireless device described herein. The wireless device described herein includes those components useful for describing some prominent features of implementations within the scope of the claims.

The determining circuit may be configured to determine the connection setup information and the service identifier. The determining circuit may include one or more of the processor 204 (FIG. 2) and the memory 206 (FIG. 2). In some implementations, means for determining may include the determining circuit.

The generating circuit may be configured to generate the public action discovery frame. The generating circuit may include one or more of the processor 204 (FIG. 2) and the memory 206 (FIG. 2). In some implementations, means for generating may include the generating circuit.

The transmitting circuit may be configured to transmit the public action discovery frame. The transmitting circuit may include one or more of the transmitter 210 (FIG. 2), the antenna 216 (FIG. 2), and the transceiver 214 (FIG. 2). In some implementations, means for transmitting may include the transmitting circuit.

FIG. 7 illustrates an example neighborhood aware network discovery frame 700. In the illustrated embodiment, the NAN discovery frame 700 includes a category field 710, an action field 720, and one or more discovery type length value (TLV) fields 730-750. As shown, the category field 710 is one octet long, the action field 720 is one octet long, and the one or more TLV fields 730-750 are each of variable length. In various embodiments, the NAN discovery frame 700 may omit one or more fields shown in FIG. 7 and/or include one or more fields not shown in FIG. 7, including any of the fields discussed herein. For example, the NAN discovery frame 700 may include any of the fields described above with respect to the NAN discovery frame 500 of FIG. 5. In some embodiments, a destination address field may be set to the same value as a NAN BSSID field. The fields in the NAN discovery frame 700 may be of different suitable lengths, and may be in a different order.

In some embodiments, the category field 710 may indicate a public action frame. The action field 720 may indicate a discovery frame. The TLV fields 730-750 are described herein in greater detail with respect to FIG. 9.

FIG. 8 illustrates an example vendor-specific discovery frame 800. In the illustrated embodiment, the vendor-specific discovery frame 800 includes a category field 810, an action field 820, an organizationally unique identifier (OUI) field 830, an OUI type field 840, an OUI subtype 850, a dialog token 860, and one or more discovery type length value (TLV) fields 870-880. As shown, the category field 810 is one octet, the action field 820 is one octet, the OUI field 830 is three octets, the OUI type field 840 is one octet, the OUI subtype 850 is one octet, the dialog token 860 is one octet, and the one or more discovery TLV fields 870-880 are of variable length. In various embodiments, the vendor-specific discovery frame 800 may omit one or more fields shown in FIG. 8 and/or include one or more fields not shown in FIG. 8, including any of the fields discussed herein. For example, the vendor-specific discovery frame 800 may include any of the fields described above with respect to the vendor-specific discovery frame 500 of FIG. 5. In some embodiments, a destination address field may be set to the same value as a NAN BSSID field. The fields in the vendor-specific discovery frame 800 may be of different suitable lengths, and may be in a different order.

In some embodiments, the category field 810 may indicate a public action frame. The action field 820 may indicate a vendor-specific action frame. The OUI field 830 may be used to uniquely identify a vendor, manufacturer, or other organization (referred to as an "assignee") globally or worldwide and may effectively reserve a block of each possible type of derivative identifier (such as MAC addresses, group addresses, Subnetwork Access Protocol identifiers, etc.) for the exclusive use of the assignee. The OUI type field 840 may be used to indicate a type of the OUI field 830 such as, for example, a MAC identifier, a context dependent identifier (CDI), an extended unique identifier (EUI), etc. The OUI subtype field 850 may indicate a subtype of the OUI type field 840. The dialog token 860 may be chosen to indicate a particular transaction. The TLV fields 830-750 are described herein in greater detail with respect to FIG. 9.

Figure 9:
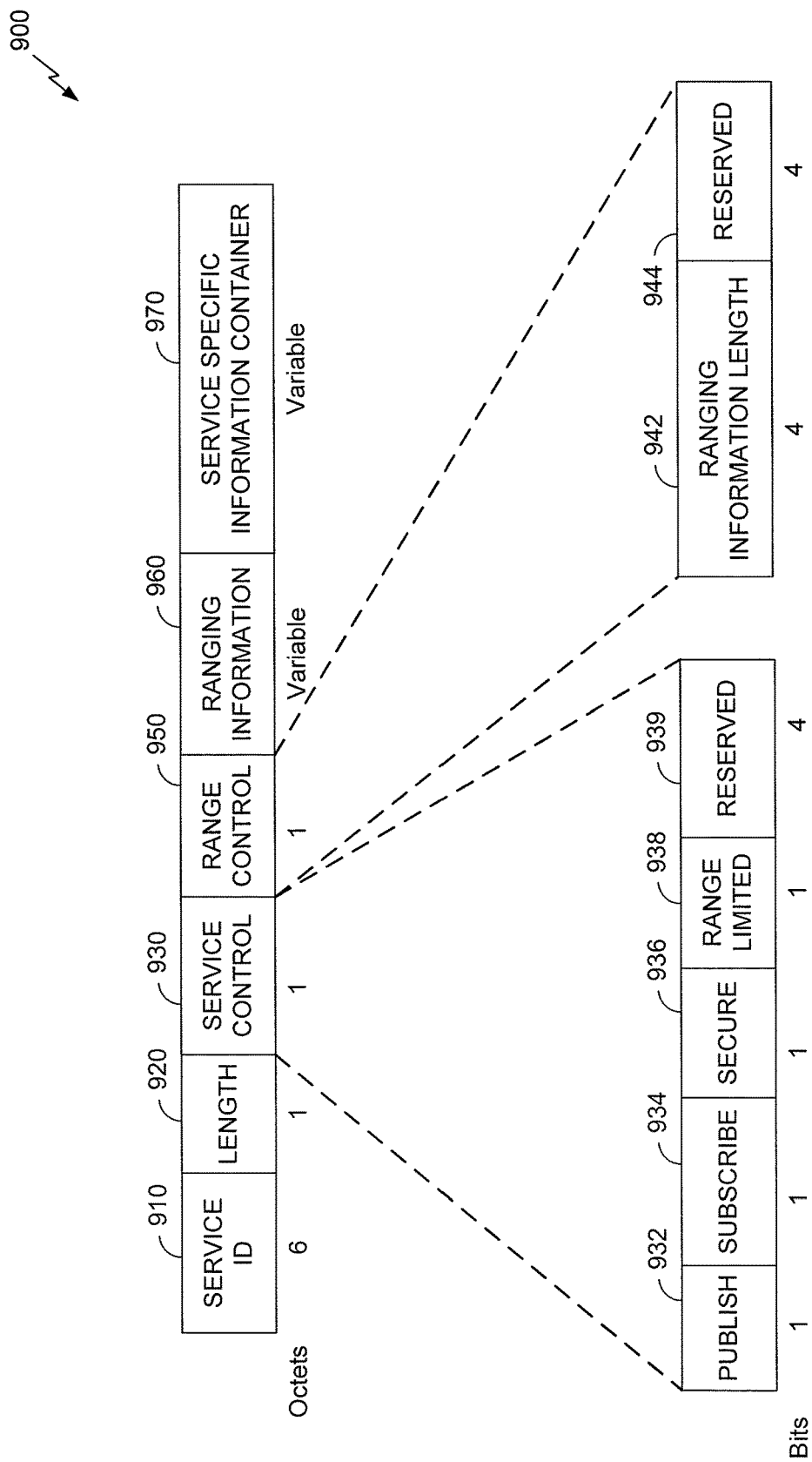
FIG. 9 shows an exemplary discovery type length value (TLV) that may be employed within the wireless communication system of FIG. 1.

FIG. 9 shows an exemplary discovery type length value (TLV) 900 that may be employed within the wireless communication system 100 of FIG. 1. In various embodiments, any device described herein, or another compatible device, may transmit the discovery TLV 900 such as, for example, the AP 184 (FIG. 1), a STA 186*a*-106*d* (FIG. 1), and/or the wireless device 202 (FIG. 2). One or more messages in the wireless communication system 100 may include the discovery TLV 900 such as, for example, the beacon 400 (FIG. 4), the discovery frame 500 (FIG. 5), and/or a probe response. In one embodiment, the discovery TLV 900 may include the discovery TLV 730-750 and/or 870-880 described above with respect to FIGS. 7 and 8.

In the illustrated embodiment, the discovery TLV 900 includes a service identifier 910, a length field 920, a service control field 930, a range control field 950, ranging information 960, and a service-specific information container 970. The discovery TLV 900 may include additional fields, and fields may be rearranged, removed, and/or resized. For example, in various embodiments, the discovery TLV 900 may omit the service control field 930, the range control field 950, and/or the ranging information 960.

The service identifier field 910 shown is six octets long. In some implementations, the service identifier field 910 may be two, five, or twelve octets long. In some implementations, the service identifier field 910 may be of variable length, such as varying length from signal to signal and/or as between service providers. The service identifier field 910 may include a value which identifies a service or application of a discovery frame. For example, the service identifier 910 may include a hash of a service name or other value based on a service. In some embodiments, a predetermined token value may be reserved. For example, service identifiers of all-zeros or all-ones may indicate NAN management operations.

The length field 920 may be used to indicate the length of the discovery TLV 900 or the total length of subsequent fields. The length field 920 shown in FIG. 9 is one octet long. In some implementations, the length field 920 may be two, five, or twelve octets long. In some implementations, the length field 920 may be of variable length, such as varying length from signal to signal and/or as between service providers. In some embodiments, a length of zero (or another predetermined token value) may indicate that one or more other fields (such as the service control field 930, the range control field 950, the ranging information 960, and/or the service specific information container 970) are not present.

The service control field 930 may include information of an applicable service. The service control field 930 shown in FIG. 9 is one octet long. In some implementations, the service control field 930 may be two, six, or eight octets long. In some implementations, the service control field 930 may be of variable length, such as varying length from signal to signal and/or as between service providers. The service control field 930 includes a public flag 932, a subscribe flag 934, a secure flag 936, a range limited flag 938, and four reserved bits. The service control field 930 may include additional fields, and fields may be rearranged, removed, and/or resized.

The range control field 950 may include information related to the ranging information 960. The range control field 950 shown in FIG. 9 is one octet long. In some implementations, the range control field 950 may be two, six, or eight octets long. In some implementations, the range control field 950 may be of variable length, such as varying length from signal to signal and/or as between service providers. The range control field 950 includes a four-bit ranging information length field 942, and four reserved bits. The ranging information length field 942 may indicate a length of the ranging information field 960. The range control field 950 may include additional fields, and fields may be rearranged, removed, and/or resized.

The ranging information field 960 may be used to indicate ranging information such as, for example, a ranging algorithm identification, ranging data, etc. The ranging information field 960 shown in FIG. 9 is variable length. In some implementations, the ranging information field 960 may be one, five, or twelve octets long.

The service-specific information container 970 may encapsulate one or more additional data fields related to an applicable service. The service-specific information container 970 shown in FIG. 9 is variable length. In some implementations, the service-specific information container 970 may be one, five, or twelve octets long.

In some embodiments, the AP 104 may indicate the service identifier, service control, range control, ranging information, and/or service-specific information in an attribute of an information element, in addition to, or instead of the frame 900. For example, the attribute may be in a vendor-specific IE.

Figure 10:
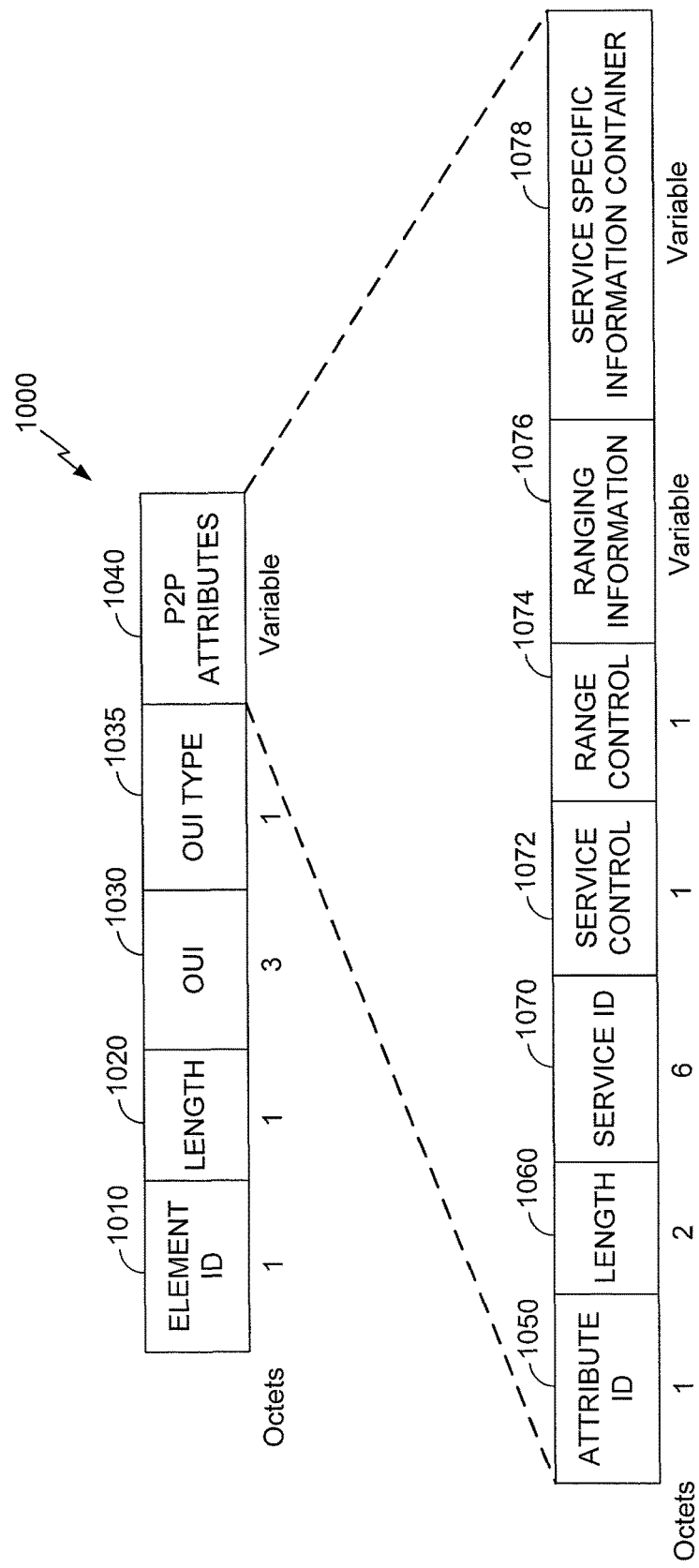
FIG. 10 shows another exemplary information element that may be employed within the wireless communication system of FIG. 1.

FIG. 10 shows another exemplary information element 1000 that may be employed within the wireless communication system 100 of FIG. 1. In various embodiments, any device described herein, or another compatible device, may transmit the information element 1000 such as, for example, the AP 194 (FIG. 1), a STA 196*a*-106*d* (FIG. 1), and/or the wireless device 202 (FIG. 2). One or more messages in the wireless communication system 100 may include the information element 1000 such as, for example, the beacon 400 (FIG. 4), the discovery frame 500 (FIG. 5), and/or a probe response. In some embodiments, the information element 1000 may be a peer-to-peer (P2P) information element such as, for example, in a WIFI-direct system.

In the illustrated embodiment, the information element 1000 includes an element identification (ID) field 1010, a length field 1020, an organizationally unique identifier (OUI) field 1030, an OUI type field 1035, and a P2P attribute field 1040. The information element 1000 may include additional fields, and fields may be rearranged, removed, and/or resized.

The element identifier field 1010 shown is one octet long. In some implementations, the element identifier field 1010 may be two, five, or twelve octets long. In some implementations, the element identifier field 1010 may be of variable length, such as varying length from signal to signal and/or as between service providers. The element identifier field 1010 may include a value which identifies the element as a vendor-specific discovery information element 1000.

The length field 1020 may be used to indicate the length of the information element 1000 or the total length of subsequent fields. The length field 1020 shown in FIG. 10 is one octet long. In some implementations, the length field 1020 may be two, five, or twelve octets long. In some implementations, the length field 1020 may be of variable length, such as varying length from signal to signal and/or as between service providers.

The OUI field 1030 may be used to uniquely identify a vendor, manufacturer, or other organization (referred to as an "assignee") globally or worldwide and may effectively reserve a block of each possible type of derivative identifier (such as MAC addresses, group addresses, Subnetwork Access Protocol identifiers, etc.) for the exclusive use of the assignee. The OUI field 1030 shown in FIG. 10 is three octets long. In some implementations, the OUI field 1030 may be two, five, or twelve octets long. In some implementations, the OUI field 1030 may be of variable length, such as varying length from signal to signal and/or as between service providers.

The OUI type field 1035 may be used to indicate a type of the OUI field 1035 such as, for example, a MAC identifier, a context dependent identifier (CDI), an extended unique identifier (EUI), etc. The OUI type field 1035 shown in FIG. 10 is one octet long. In some implementations, the OUI type field 1035 may be two, five, or twelve octets long. In some implementations, the OUI type field 1035 may be of variable length, such as varying length from signal to signal, and/or as between service providers.

The P2P attribute 1040 may encapsulate an attribute element indicating the service identifier, service control, range control, ranging information, and/or service-specific information. The P2P attribute 1040 shown in FIG. 10 is of variable length. In some implementations, the P2P attribute 1040 may be 15 through 21 octets long. The P2P attribute 1040 includes an attribute ID 1050, a length field 1060, a service identifier 1070, a service control field 1072, a range control field 1074, ranging information 1076, and service-specific information 1078. The P2P attribute 1040 may include additional fields, and fields may be rearranged, removed, and/or resized. For example, in various embodiments, the discovery TLV 1000 may omit the service control field 1072, the range control field 1074, and/or the ranging information 1076.

The attribute identifier field 1050 shown is one octet long. In some implementations, the attribute identifier field 1050 may be two, five, or twelve octets long. In some implementations, the attribute identifier field 1050 may be of variable length, such as varying length from signal to signal and/or as between service providers. The attribute identifier field 1050 may include a value which identifies the element as a discovery window attribute 1040.

The length field 1060 may be used to indicate the length of the P2P attribute 1040 or the total length of subsequent fields. The length field 1060 shown in FIG. 10 is two octets long. In some implementations, the length field 1060 may be one, five, or twelve octets long. In some implementations, the length field 1060 may be of variable length, such as varying length from signal to signal and/or as between service providers. In some embodiments, a length of zero (or another predetermined token value) may indicate that one or more other fields (such as the service control field 1072, the range control field 1074, the ranging information 1076, and/or the service specific information container 1078) are not present.

The service identifier field 1070 shown is six octets long. In some implementations, the service identifier field 1070 may be two, five, or twelve octets long. In some implementations, the service identifier field 1070 may be of variable length, such as varying length from signal to signal and/or as between service providers. The service identifier field 1070 may include a value which identifies a service or application of a discovery frame. For example, the service identifier 1070 may include a hash of a service name or other value based on a service. In some embodiments, a predetermined token value may be reserved. For example, service identifiers of all-zeros or all-ones may indicate NAN management operations.

The service control field 1072 may include information of an applicable service. The service control field 1072 shown in FIG. 10 is one octet long. In some implementations, the service control field 1072 may be two, six, or eight octets long. In some implementations, the service control field 1072 may be of variable length, such as varying length from signal to signal and/or as between service providers. In an embodiment, the service control field 1072 may include one or more fields of the service control field 1630, described above with respect to FIG. 9. The service control field 1072 may include additional fields, and fields may be rearranged, removed, and/or resized.

The range control field 1074 may include information related to the ranging information 1076. The range control field 1074 shown in FIG. 10 is one octet long. In some implementations, the range control field 1074 may be two, six, or eight octets long. In some implementations, the range control field 1074 may be of variable length, such as varying length from signal to signal and/or as between service providers. In an embodiment, the range control field 1074 may include one or more fields of the range control field 1640, described above with respect to FIG. 9. The service control field 1072 may include additional fields, and fields may be rearranged, removed, and/or resized.

The ranging information field 1076 may be used to indicate ranging information such as, for example, a ranging algorithm identification, ranging data, etc. The ranging information field 1076 shown in FIG. 10 is variable length. In some implementations, the ranging information field 1076 may be one, five, or twelve octets long.

The service-specific information container 1078 may encapsulate one or more additional data fields related to an applicable service. The service-specific information container 1078 shown in FIG. 10 is variable length. In some implementations, the service-specific information container 1078 may be one, five, or twelve octets long.

In some embodiments, the range control field 1074 and/or the range control field 1640 (FIG. 9) may include additional range control information such as, for example, an indication of a ranging algorithm type. In other words, the range control field 1074 may indicate a type of algorithm to use for ranging.

Figure 11:
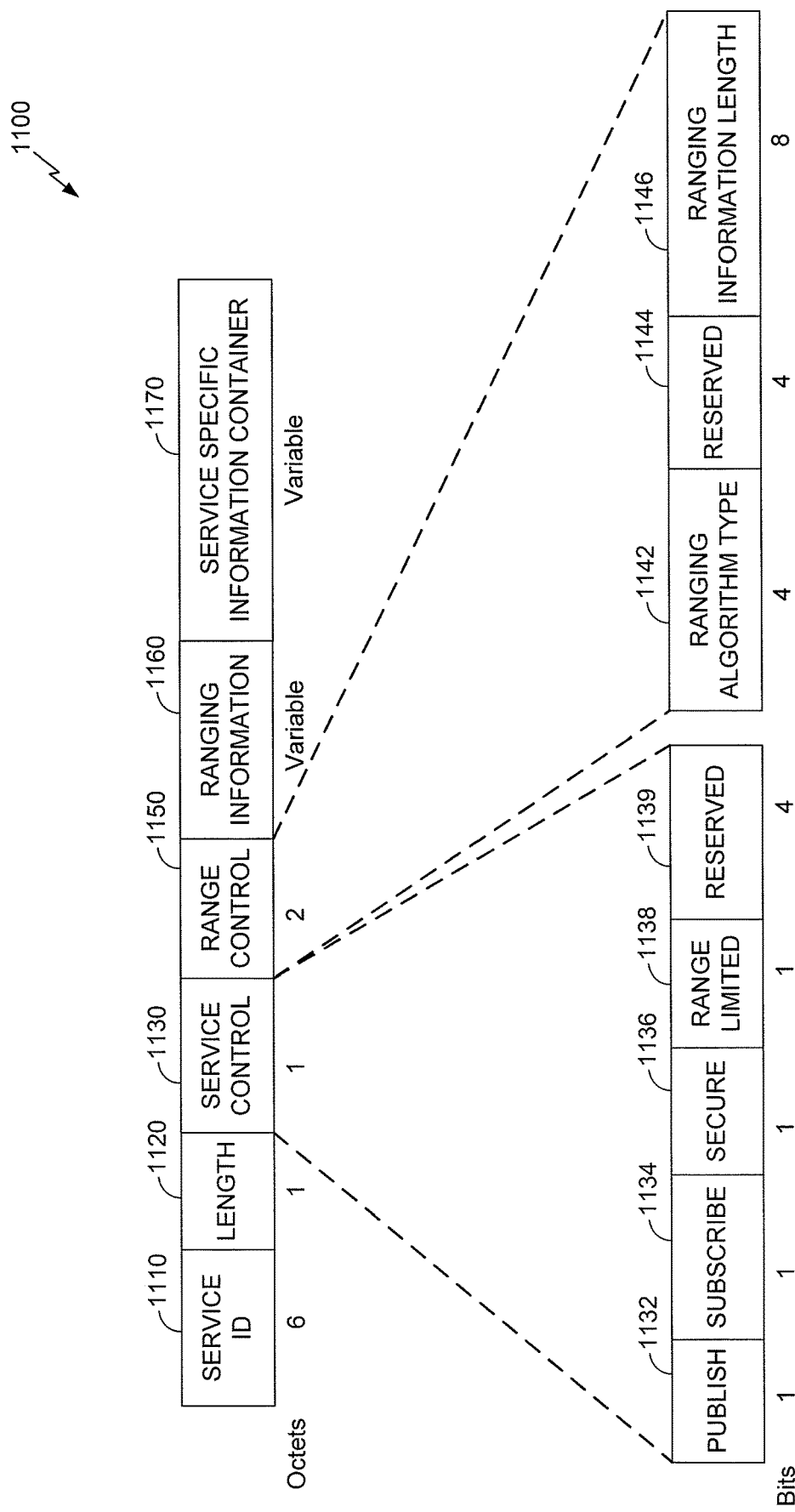
FIG. 11 shows another exemplary discovery type length value (TLV) that may be employed within the wireless communication system of FIG. 1.

FIG. 11 shows another exemplary discovery type length value (TLV) 1100 that may be employed within the wireless communication system 100 of FIG. 1. In various embodiments, any device described herein, or another compatible device, may transmit the discovery TLV 1100 such as, for example, the AP 204 (FIG. 1), a STA 206a-106d (FIG. 1), and/or the wireless device 202 (FIG. 2). One or more messages in the wireless communication system 100 may include the discovery TLV 1100 such as, for example, the beacon 400 (FIG. 4), the discovery frame 500 (FIG. 5), and/or a probe response. In one embodiment, the discovery TLV 1100 may include the discovery TLV 730-750 and/or 870-880 described above with respect to FIGS. 7 and 8.

In the illustrated embodiment, the discovery TLV 1100 includes a service identifier 1110, a length field 1120, a service control field 1130, a range control field 1150, ranging information 1160, and a service-specific information container 1170. The discovery TLV 1100 may include additional fields, and fields may be rearranged, removed, and/or resized. For example, in various embodiments, the discovery TLV 1100 may omit the service control field 1130, the range control field 1150, and/or the ranging information 1160.

The service identifier field 1110 shown is six octets long. In some implementations, the service identifier field 1110 may be two, five, or twelve octets long. In some implementations, the service identifier field 1110 may be of variable length, such as varying length from signal to signal and/or as between service providers. The service identifier field 1110 may include a value which identifies a service or application of a discovery frame. For example, the service identifier 1110 may include a hash of a service name or other value based on a service. In some embodiments, a predetermined token value may be reserved. For example, service identifiers of all-zeros or all-ones may indicate NAN management operations.

The length field 1120 may be used to indicate the length of the discovery TLV 1100 or the total length of subsequent fields. The length field 1120 shown in FIG. 11 is one octet long. In some implementations, the length field 1120 may be two, five, or twelve octets long. In some implementations, the length field 1120 may be of variable length, such as varying length from signal to signal and/or as between service providers. In some embodiments, a length of zero (or another predetermined token value) may indicate that one or more other fields (such as the service control field 1130, the range control field 1150, the ranging information 1160, and/or the service specific information container 1170) are not present.

The service control field 1130 may include information of an applicable service. The service control field 1130 shown in FIG. 11 is one octet long. In some implementations, the service control field 1130 may be two, six, or eight octets long. In some implementations, the service control field 1130 may be of variable length, such as varying length from signal to signal and/or as between service providers. The service control field 1130 includes a public flag 1132, a subscribe flag 1134, a secure flag 1136, a range limited flag 1138, and four reserved bits. The service control field 1130 may include additional fields, and fields may be rearranged, removed, and/or resized.

The range control field 1150 may include information related to the ranging information 1160. The range control field 1150 shown in FIG. 11 is two octets long. In some implementations, the range control field 1150 may be one, six, or eight octets long. In some implementations, the range control field 1150 may be of variable length, such as varying length from signal to signal and/or as between service providers. The range control field 1150 includes a four-bit ranging algorithm type 1142, four reserved bits 1144, and an eight-bit ranging information length field 1146, and four reserved bits. The range control field 1150 may include additional fields, and fields may be rearranged, removed, and/or resized.

In some embodiments, the ranging algorithm type 1142 may indicate a type of algorithm a device (such as the AP 104 and/or the STAs 106a-106e of FIG. 1) may use for ranging. The ranging information length field 1146 may indicate a length of a ranging information field such as, for example, the ranging information 1160.

The ranging information field 1160 may be used to indicate ranging information such as, for example, a ranging algorithm identification, ranging data, etc. The ranging information field 1160 shown in FIG. 11 is variable length. In some implementations, the ranging information field 1160 may be one, five, or twelve octets long.

The service-specific information container 1170 may encapsulate one or more additional data fields related to an applicable service. The service-specific information container 1170 shown in FIG. 11 is variable length. In some implementations, the service-specific information container 1170 may be one, five, or twelve octets long.

In some embodiments, the AP 104 may indicate the service identifier, service control, range control, ranging information, and/or service-specific information in an attribute of an information element, in addition to, or instead of the frame 1100. For example, the attribute may be in a vendor-specific IE.

Figure 12:
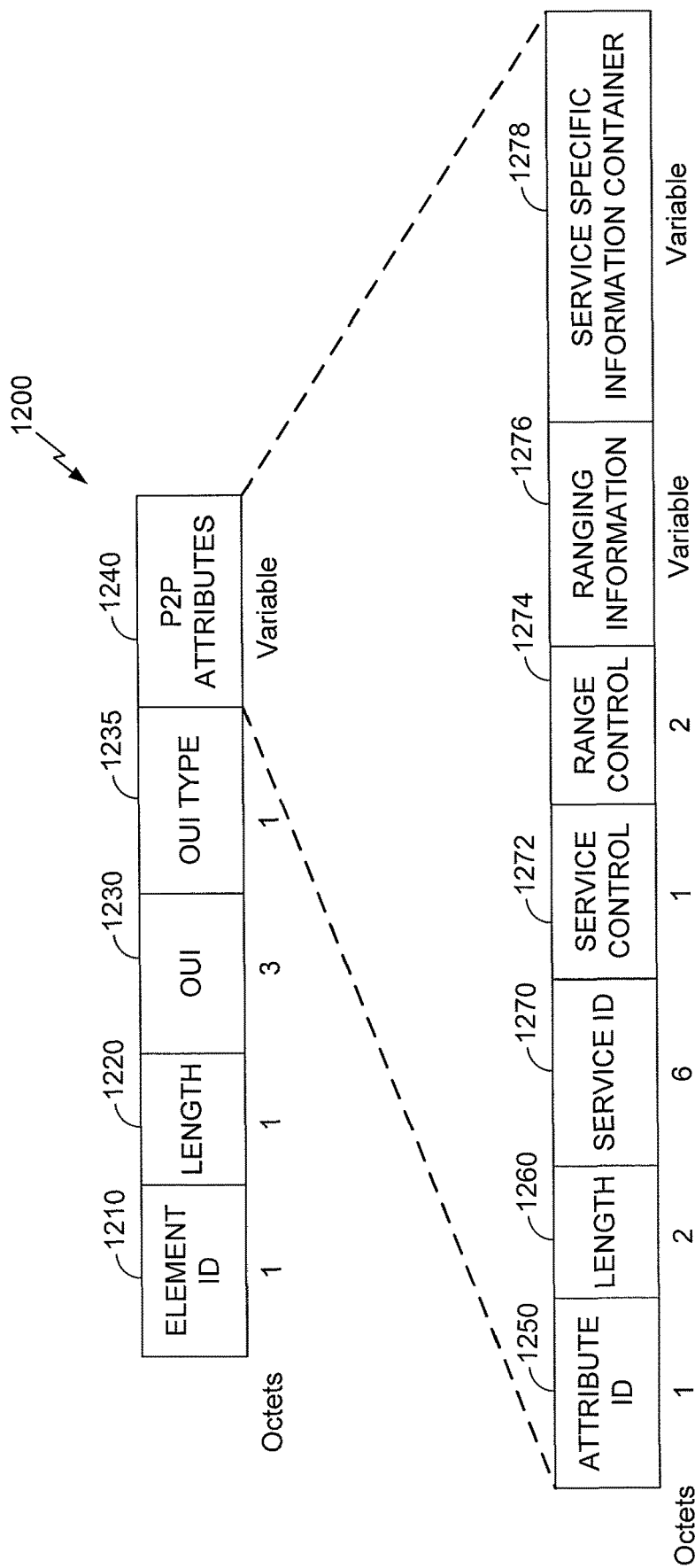
FIG. 12 shows another exemplary information element that may be employed within the wireless communication system of FIG. 1.

FIG. 12 shows another exemplary information element 1200 that may be employed within the wireless communication system 100 of FIG. 1. In various embodiments, any device described herein, or another compatible device, may transmit the information element 1200 such as, for example, the AP 214 (FIG. 1), a STA 216a-106d (FIG. 1), and/or the wireless device 202 (FIG. 2). One or more messages in the wireless communication system 100 may include the information element 1200 such as, for example, the beacon 400 (FIG. 4), the beacon 500 (FIG. 5), the discovery frame 500 (FIG. 5), and/or a probe response. In some embodiments, the information element 1200 may be a peer-to-peer (P2P) information element such as, for example, in a WIFI-direct system.

In the illustrated embodiment, the information element 1200 includes an element identification (ID) field 1210, a length field 1220, an organizationally unique identifier (OUI) field 1230, an OUI type field 1235, and a P2P attribute field 1240. The information element 1200 may include additional fields, and fields may be rearranged, removed, and/or resized.

The element identifier field 1210 shown is one octet long. In some implementations, the element identifier field 1210 may be two, five, or twelve octets long. In some implementations, the element identifier field 1210 may be of variable length, such as varying length from signal to signal and/or as between service providers. The element identifier field 1210 may include a value which identifies the element as a vendor-specific discovery information element 1200.

The length field 1220 may be used to indicate the length of the information element 1200 or the total length of subsequent fields. The length field 1220 shown in FIG. 12 is one octet long. In some implementations, the length field 1220 may be two, five, or twelve octets long. In some implementations, the length field 1220 may be of variable length, such as varying length from signal to signal and/or as between service providers.

The OUI field 1230 may be used to uniquely identify a vendor, manufacturer, or other organization (referred to as an "assignee") globally or worldwide and may effectively reserve a block of each possible type of derivative identifier (such as MAC addresses, group addresses, Subnetwork Access Protocol identifiers, etc.) for the exclusive use of the assignee. The OUI field 1230 shown in FIG. 12 is three octets long. In some implementations, the OUI field 1230 may be two, five, or twelve octets long. In some implementations, the OUI field 1230 may be of variable length, such as varying length from signal to signal and/or as between service providers.

The OUI type field 1235 may be used to indicate a type of the OUI field 1235 such as, for example, a MAC identifier, a context dependent identifier (CDI), an extended unique identifier (EUI), etc. The OUI type field 1235 shown in FIG. 12 is one octet long. In some implementations, the OUI type field 1235 may be two, five, or twelve octets long. In some implementations, the OUI type field 1235 may be of variable length, such as varying length from signal to signal and/or as between service providers.

The P2P attribute 1240 may encapsulate an attribute element indicating the service identifier, service control, range control, ranging information, and/or service-specific information. The P2P attribute 1240 shown in FIG. 12 is of variable length. In some implementations, the P2P attribute 1240 may be 15 through 21 octets long. The P2P attribute 1240 includes an attribute ID 1250, a length field 1260, a service identifier 1270, a service control field 1272, a range control field 1274, ranging information 1276, and service-specific information 1278. The P2P attribute 1240 may include additional fields, and fields may be rearranged, removed, and/or resized. For example, in various embodiments, the discovery TLV 1200 may omit the service control field 1272, the range control field 1274, and/or the ranging information 1276.

The attribute identifier field 1250 shown is one octet long. In some implementations, the attribute identifier field 1250 may be two, five, or twelve octets long. In some implementations, the attribute identifier field 1250 may be of variable length, such as varying length from signal to signal and/or as between service providers. The attribute identifier field 1250 may include a value which identifies the element as a discovery window attribute 1240.

The length field 1260 may be used to indicate the length of the P2P attribute 1240 or the total length of subsequent fields. The length field 1260 shown in FIG. 12 is two octets long. In some implementations, the length field 1260 may be one, five, or twelve octets long. In some implementations, the length field 1260 may be of variable length, such as varying length from signal to signal and/or as between service providers. In some embodiments, a length of zero (or another predetermined token value) may indicate that one or more other fields (such as the service control field 1272, the range control field 1274, the ranging information 1276, and/or the service specific information container 1278) are not present.

The service identifier field 1270 shown is six octets long. In some implementations, the service identifier field 1270 may be two, five, or twelve octets long. In some implementations, the service identifier field 1270 may be of variable length, such as varying length from signal to signal and/or as between service providers. The service identifier field 1270 may include a value which identifies a service or application of a discovery frame. For example, the service identifier 1270 may include a hash of a service name or other value based on a service. In some embodiments, a predetermined token value may be reserved. For example, service identifiers of all-zeros or all-ones may indicate NAN management operations.

The service control field 1272 may include information of an applicable service. The service control field 1272 shown in FIG. 12 is one octet long. In some implementations, the service control field 1272 may be two, six, or eight octets long. In some implementations, the service control field 1272 may be of variable length, such as varying length from signal to signal and/or as between service providers. In an embodiment, the service control field 1272 may include one or more fields of the service control field 1130, described above with respect to FIG. 11. The service control field 1272 may include additional fields, and fields may be rearranged, removed, and/or resized.

The range control field 1274 may include information related to the ranging information 1276. The range control field 1274 shown in FIG. 12 is two octets long. In some implementations, the range control field 1274 may be one, six, or eight octets long. In some implementations, the range control field 1274 may be of variable length, such as varying length from signal to signal and/or as between service providers. In an embodiment, the range control field 1274 may include one or more fields of the range control field 2040, described above with respect to FIG. 11. The service control field 1272 may include additional fields, and fields may be rearranged, removed, and/or resized.

The ranging information field 1276 may be used to indicate ranging information such as, for example, a ranging algorithm identification, ranging data, etc. The ranging information field 1276 shown in FIG. 12 is variable length. In some implementations, the ranging information field 1276 may be one, five, or twelve octets long.

The service-specific information container 1278 may encapsulate one or more additional data fields related to an applicable service. The service-specific information container 1278 shown in FIG. 12 is variable length. In some implementations, the service-specific information container 1278 may be one, five, or twelve octets long.

Figure 13:
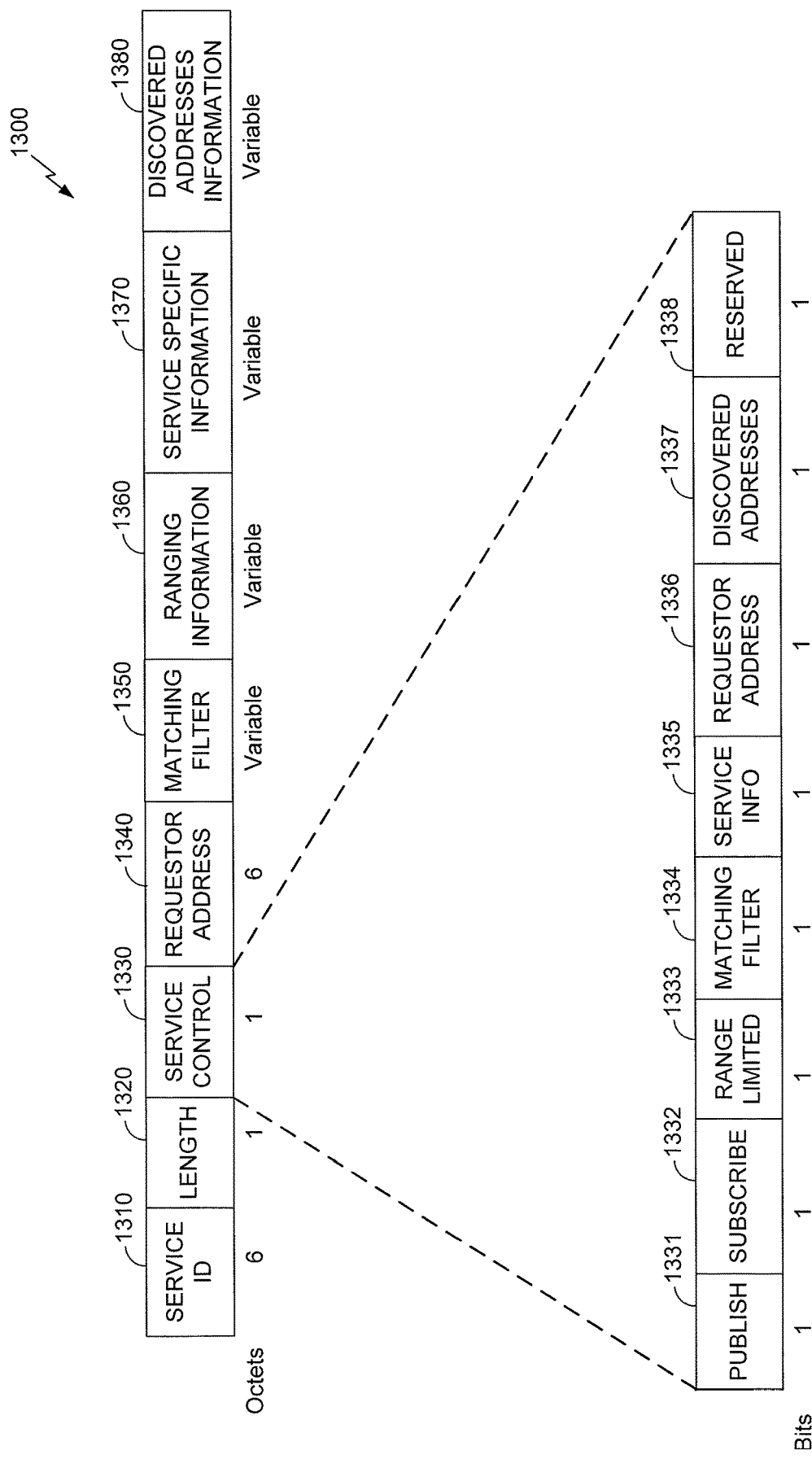
FIG. 13 shows an exemplary discovery type length value (TLV) that may be employed within the wireless communication system of FIG. 1.

FIG. 13 shows an exemplary discovery type length value (TLV) 1300 that may be employed within the wireless communication system 100 of FIG. 1. In various embodiments, any device described herein, or another compatible device, may transmit the discovery TLV 1300 such as, for example, the AP 184 (FIG. 1), a STA 186*a*-106*d* (FIG. 1), and/or the wireless device 202 (FIG. 2). One or more messages in the wireless communication system 100 may include the discovery TLV 1300 such as, for example, the beacon 400 (FIG. 4), the discovery frames 700 and 1500 (FIGS. 7 and 15), a probe response, and/or a discovery query frame. In one embodiment, the discovery TLV 1300 may include the discovery TLV 730-750 and/or 870-880 described above with respect to FIGS. 7 and 8. One or more fields of the TLV 1300 may be included in an attribute of an information element, in addition to, or instead of the frame 1300. For example, the attribute may be in a vendor-specific IE.

In the illustrated embodiment, the discovery TLV 1300 includes a service identifier 1310, a length field 1320, a service control field 1330, a requestor address field 1340, a matching filter container 1350, a ranging information container 1360, a service specific information container 1370, and a discovered addresses information container 1380. The discovery TLV 1300 may include additional fields, and fields may be rearranged, removed, and/or resized. For example, in various embodiments, the discovery TLV 1300 may omit the service control field 1330 and/or the matching filter container 1350.

The service identifier field 1310 shown is six octets long. In some implementations, the service identifier field 1310 may be two, five, or twelve octets long. In some implementations, the service identifier field 1310 may be of variable length, such as varying length from signal to signal and/or as between service providers. The service identifier field 1310 may include a value which identifies a service or application of a discovery frame. For example, the service identifier 1310 may include a hash of a service name or other value based on a service. In some embodiments, a predetermined token value may be reserved. For example, service identifiers of all-zeros or all-ones may indicate NAN management operations.

The length field 1320 may be used to indicate the length of the discovery TLV 1300 or the total length of subsequent fields. The length field 1320 shown in FIG. 13 is one octet long. In some implementations, the length field 1320 may be two, five, or twelve octets long. In some implementations, the length field 1320 may be of variable length, such as varying length from signal to signal and/or as between service providers. In some embodiments, a length of zero (or another predetermined token value) may indicate that one or more other fields (such as the service control field 1330, the matching filter container 1350, the ranging information container 1360, the service specific information container 1370, and/or the discovered addresses information container 1380) are not present.

The service control field 1330 may indicate information of an applicable service. The service control field 1330 shown in FIG. 13 is one octet long. In some implementations, the service control field 1330 may be two, six, or eight octets long. In some implementations, the service control field 1330 may be of variable length, such as varying length from signal to signal and/or as between service providers. The service control field 1330 includes a publish flag 1331, a subscribe flag 1332, a range limited, flag 1333, a matching filter flag 1334, a service information flag 1335, a requestor address flag 1336, a discovered addresses flag 1337, and a reserved bit. The service control field 1330 may include additional fields, and fields may be rearranged, removed, and/or resized.

In the illustrated embodiment, the publish flag 1331, the subscribe flag 1332, the range limited flag 1333, the matching filter flag 1334, the service information flag 1335, the requestor address flag 1336, and the discovered addresses flag 1337 are each one bit long. In various embodiments, the matching filter flag 1334 may indicate whether the matching filter container 1350 is present in the discovery TLV 1300. The service information flag may indicate whether the service specific information container 1370 is present in the discovery TLV 1300. The requestor address flag 1336 may indicate whether the discovery TLV 1300 includes the requestor address field 1340. The discovered addresses flag 1337 may indicate whether the discovered addresses information container 1380 is present in the discovery TLV 1300.

The requestor address field 1340 may indicate an address of a device requesting discovery information contained in the TLV 1300. The requestor address field 1340 shown in FIG. 13 is six octets long. In some implementations, the requestor address field 1340 may be four, eight, or twelve octets long. In some embodiments, the requestor address field 1340 may be a variable length. The requestor address field 1340 may include, for example, a MAC address. In some embodiments, the requestor address field 1340 may include multiple requestor addresses. For example, the requestor address field 1340 may include a requestor address length field and a plurality of requestor addresses. The requestor address field 1340 may include additional fields, and fields may be rearranged, removed, and/or resized. In an embodiment, a single discovery frame may include multiple TLVs 1300, each carrying a different requestor address field 1340.

The matching filter container 1350 may indicate matching filter information. The matching filter container 1350 shown in FIG. 13 is a variable length. In some implementations, the matching filter container 1350 may be two, six, or eight octets long. The matching filter container 1350 may include a matching filter length field and/or a matching filter for the NAN. The matching filter length field may indicate the length of the matching filter. The matching filter length field may be one octet long. In an embodiment, the matching filter length may be zero (or another predetermined token value) and the matching filter may be omitted. The matching filter may be a variable length. The matching filter container 1350 may include additional fields, and fields may be rearranged, removed, and/or resized.

The ranging information container 1360 may indicate ranging information. The ranging information container 1360 shown in FIG. 13 is a variable length. In some implementations, ranging information container 1360 may be two, six, or eight octets long. The ranging information container 1360 may include one or more of a range information length field, a range control field, and a ranging information field. The ranging information container 1360 may include additional fields, and fields may be rearranged, removed, and/or resized.

The range information length field may indicate a length of the ranging information field. The range information length field may be one octet long. In an embodiment, the ranging information length field may be zero (or another predetermined token value) and the ranging information field may be omitted. The range control field may indicate a ranging algorithm type. The range control field may be one octet long. The range control field may include additional fields, and fields may be rearranged, removed, and/or resized. The ranging information field may be used to indicate ranging information such as, for example, a ranging algorithm identification, ranging data, etc. The ranging information field may be a variable length. In some implementations, the ranging information field may be one, five, or twelve octets long.

The service-specific information container 1370 may encapsulate one or more additional data fields related to an applicable service. The service-specific information container 1370 shown in FIG. 13 is a variable length. In some implementations, the service-specific information container 1370 may be one, five, or twelve octets long. The service-specific information container 1370 may include a service-specific information length field and/or a service-specific information field. The service-specific information length field may indicate the length of the service-specific information field. In an embodiment, the service-specific information length field may be zero (or another predetermined token value) and the service-specific information field may be omitted. The service-specific information field may be a variable length. In some implementations, the service-specific information field may be one, five, or twelve octets long.

The discovered addresses information container 1380 may indicate one or more addresses of devices that have been discovered by the transmitting device 202 (FIG. 2). The discovered addresses information container 1380 shown in FIG. 13 is a variable length. In some implementations, the discovered addresses information container 1380 may be one, five, or twelve octets long. The discovered address information container 1380 is described in greater detail below with respect to FIG. 14.

Referring back to FIG. 3, in some embodiments, the DW 304 may include a discovery query window and a discovery response window. In various embodiments, the discovery query window and the discovery response window may overlap. During the discovery query window, searching APs or STAs may send discovery query messages in a discovery action frame. Responding APs or STAs may respond to queries in the discovery response window. Listening APs or STAs may receive discovery query responses to searching APs or STAs. Some of the discovery responses may be missed by one or more listening APs. In some embodiments, discovery response queries may indicate one or more addresses of devices that have been discovered by the transmitting device 202 (FIG. 2). Responding APs or STAs may transmit additional discovery responses accordingly.

Figure 14:
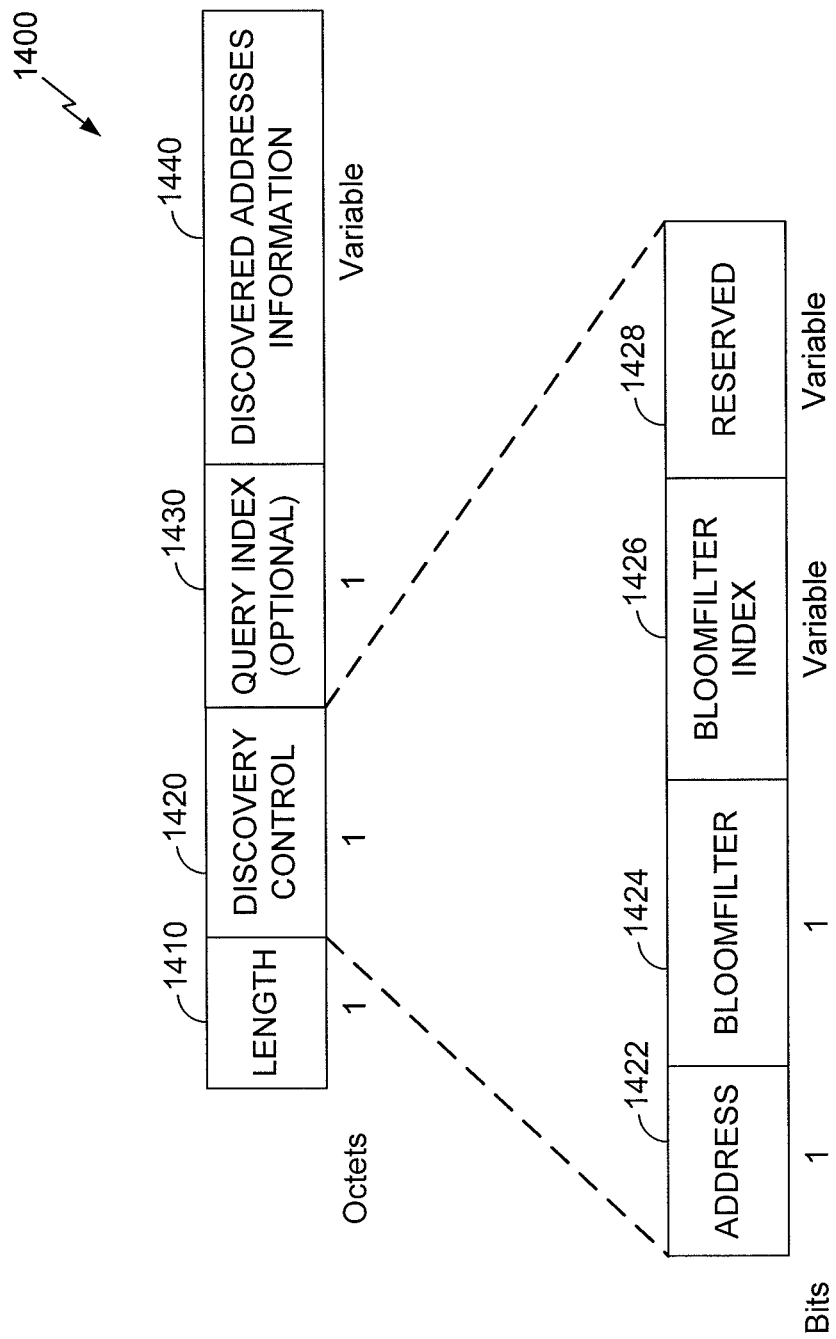
FIG. 14 shows an exemplary discovered addresses information container that may be employed within the wireless communication system of FIG. 1.

FIG. 14 shows an exemplary discovered addresses information container 1400 that may be employed within the wireless communication system 100 of FIG. 1. In various embodiments, any device described herein, or another compatible device, may transmit the discovered addresses information container 1400 such as, for example, the AP 184 (FIG. 1), a STA 186a-106d (FIG. 1), and/or the wireless device 202 (FIG. 2). One or more messages in the wireless communication system 100 may include the discovery TLV 1300 such as, for example, the beacon 400 (FIG. 4), the discovery frames 700 and 1500 (FIGS. 7 and 15), a probe response, and/or a discovery query frame. In one embodiment, the discovered addresses information container 1400 may include the discovered addresses information container 1380 described above with respect to FIG. 13.

In the illustrated embodiment, discovered addresses information container 1400 includes a length field 1410, a discovery control field 1420, an optional query index 1430, and discovered address information 1440. The discovery TLV 1300 may include additional fields, and fields may be rearranged, removed, and/or resized. For example, in various embodiments, the discovered address information 1440 may be omitted when no devices have been discovered.

The length field 1410 may be used to indicate the length of the discovered addresses information container 1400 or the total length of subsequent fields. The length field 1410 shown in FIG. 14 is one octet long. In some implementations, the length field 1410 may be two, five, or twelve octets long. In some implementations, the length field 1410 may be of variable length, such as varying length from signal to signal and/or as between service providers. In some embodiments, a length of zero (or another predetermined token value) may indicate that one or more other fields (such as the discovery control field 1420 and/or the discovered addresses information field 1440) are not present.

The discovery control field 1420 may indicate control information for the discovered address information 1440. The discovery control field 1420 shown in FIG. 14 is one octet long. In some implementations, the discovery control field 1420 may be two, six, or eight octets long. In some implementations, the discovery control field 1420 may be of variable length, such as varying length from signal to signal and/or as between service providers. The discovery control field 1420 includes an address flag 1422, a Bloom filter flag 1424, a Bloom-filter index 1426, and one or more reserved bits 1428. The discovery control field 1420 may include additional fields, and fields may be rearranged, removed, and/or resized.

The address flag 1422 may indicate whether the discovered address information 1440 includes full or partial address information on discovered devices. The address flag 1422 shown in FIG. 14 is one bit. The Bloom filter flag 1424 may indicate whether the discovered address information 1440 includes a Bloom filter of discovered device addresses. The Bloom filter flag 1424 shown in FIG. 14 is one bit. The Bloom filter index 1426 may indicate a set of hash functions used in the Bloom filter. The Bloom filter index shown in FIG. 14 is a variable length.

The query index 1430 may identify a particular discovery query. The query index 1430 shown in FIG. 14 is one octet long. In some implementations, the query index 1430 may be two, six, or eight octets long. In some implementations, the query index 1430 may be of variable length, such as varying length from signal to signal and/or as between service providers. The query index 1430 may be incremented, decremented, or otherwise modified each time a follow-up query is transmitted. In an embodiment, the Bloom filter index 1426 may be modified when the query index 1430 is modified.

The discovered address information 1440 may indicate one or more addresses of discovered devices. The discovered address information 1440 shown in FIG. 14 is a variable length. In various implementations, discovered address information 1440 may be 50, 100, or 200 octets long. In some embodiments, the discovered address information 1440 may include a list of full or partial addresses of discovered devices. The list may be encoded or filtered. In some embodiments, the discovered device addresses are represented by a Bloom filter. A receiving device may receive the discovered address information 1440 and may determine whether the receiving device address is contained in the device address information 1440. If the receiving device address is not contained in the device address information 1440, the receiving device may transmit one or more discovery packets to announce its presence in the NAN.

Figure 15:
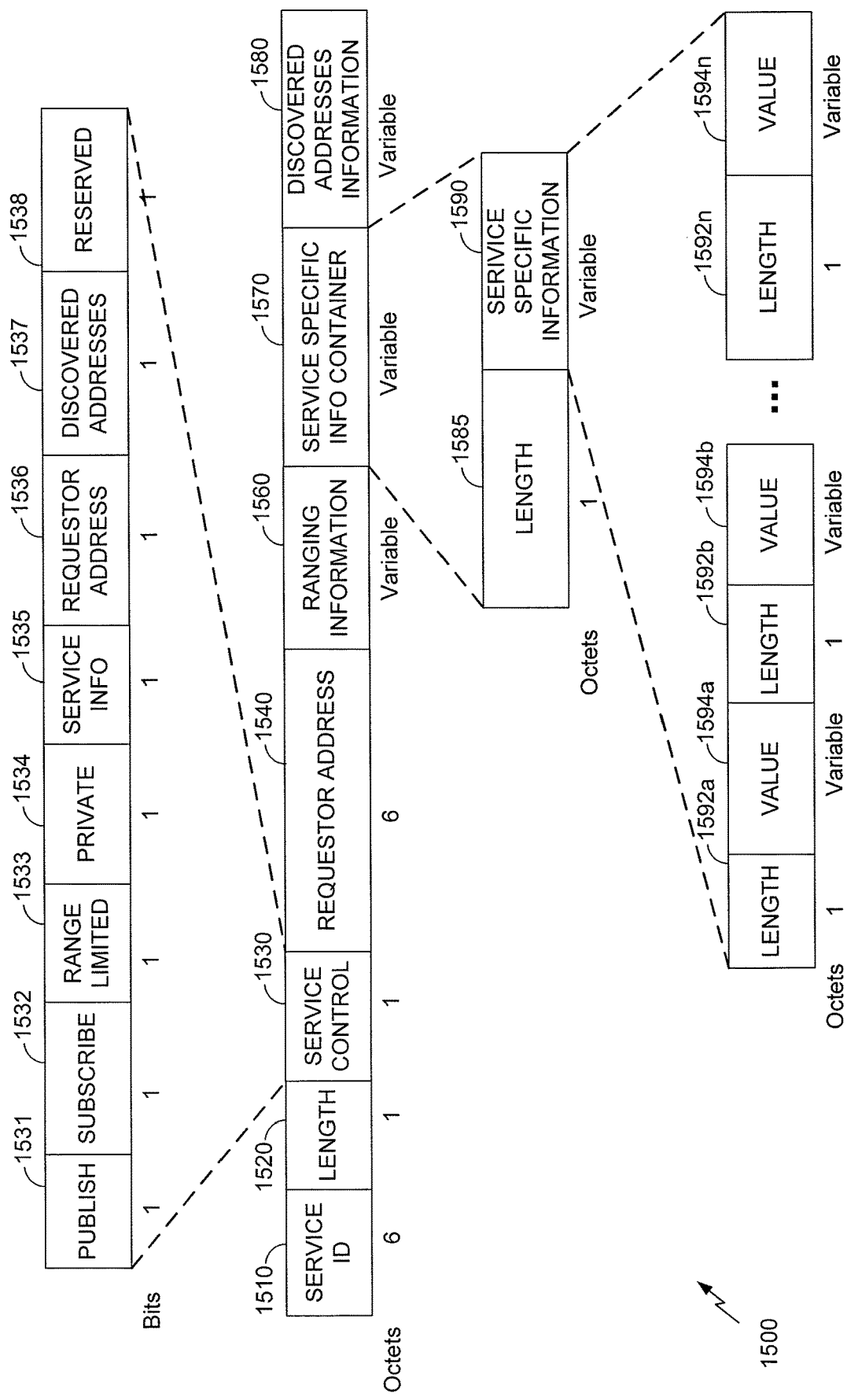
FIG. 15 shows another exemplary discovery type length value (TLV) that may be employed within the wireless communication system of FIG. 1.

FIG. 15 shows another exemplary discovery type length value (TLV) 1500 that may be employed within the wireless communication system 100 of FIG. 1. In various embodiments, any device described herein, or another compatible device, may transmit the discovery TLV 1500 such as, for example, the AP 184 (FIG. 1), a STA 186*a*-106*d* (FIG. 1), and/or the wireless device 202 (FIG. 2). One or more messages in the wireless communication system 100 may include the discovery TLV 1500 such as, for example, the beacon 400 (FIG. 4), the discovery frames 700 and 1500 (FIGS. 7 and 15), a probe response, and/or a discovery query frame. In one embodiment, the discovery TLV 1500 may include the discovery TLV 730-750 and/or 870-880 described above with respect to FIGS. 7 and 8. One or more fields of the TLV 1500 may be included in an attribute of an information element, in addition to, or instead of the frame 1500. For example, the attribute may be in a vendor-specific IE.

In the illustrated embodiment, the discovery TLV 1500 includes a service identifier 1510, a length field 1520, a service control field 1530, a requestor address field 1540, a ranging information container 1560, a service specific information container 1570, and a discovered addresses information container 1580. The discovery TLV 1500 may include additional fields, and fields may be rearranged, removed, and/or resized. For example, in various embodiments, the discovery TLV 1500 may omit the service control field 1530 and/or include a matching filter container.

The service identifier field 1510 shown is six octets long. In some implementations, the service identifier field 1510 may be two, five, or twelve octets long. In some implementations, the service identifier field 1510 may be of variable length, such as varying length from signal to signal and/or as between service providers. The service identifier field 1510 may include a value which identifies a service or application of a discovery frame. For example, the service identifier 1510 may include a hash of a service name or other value based on a service. In some embodiments, a predetermined token value may be reserved. For example, service identifiers of all-zeros or all-ones may indicate NAN management operations.

The length field 1520 may be used to indicate the length of the discovery TLV 1500 or the total length of subsequent fields. The length field 1520 shown in FIG. 15 is one octet long. In some implementations, the length field 1520 may be two, five, or twelve octets long. In some implementations, the length field 1520 may be of variable length, such as varying length from signal to signal and/or as between service providers. In some embodiments, a length of zero (or another predetermined token value) may indicate that one or more other fields (such as the service control field 1530, the ranging information container 1560, the service specific information container 1570, and/or the discovered addresses information container 1580) are not present.

The service control field 1530 may indicate information of an applicable service. The service control field 1530 shown in FIG. 15 is one octet long. In some implementations, the service control field 1530 may be two, six, or eight octets long. In some implementations, the service control field 1530 may be of variable length, such as varying length from signal to signal and/or as between service providers. The service control field 1530 includes a publish flag 1531, a subscribe flag 1532, a range limited flag 1533, a private flag 1534, a service information flag 1535, a requestor address flag 1536, a discovered addresses flag 1537, and a reserved bit. The service control field 1530 may include additional fields, and fields may be rearranged, removed, and/or resized.

In the illustrated embodiment, the publish flag 1531, the subscribe flag 1532, the range limited flag 1533, the matching filter flag 1534, the service information flag 1535, the requestor address flag 1536, and the discovered addresses flag 1537 are each one bit long. In various embodiments, the private flag 1534 may indicate whether the service specific information 1590, described in greater detail below, is parseable. In various embodiments, a transmitting device may set the private flag 1534 to indicate that the service specific information 1590 is not included in the TLV 1500.

In some embodiments, a transmitting device may set the private flag 1534 to indicate that the service specific information 1590 is not readable (for example, encrypted or omitted) by a receiving device. In some embodiments, a transmitting device may set the private flag 1534 to indicate that a receiving device may refrain from parsing the service specific information 1590. Similarly, in various embodiments, a device receiving the TLV 1500 may be unable to parse the service specific information 1590 when the private flag 1534 is set. In some embodiments, a device receiving the TLV 1500 may refrain from parsing the service specific information 1590 when the private flag 1534 is set, and may parse the service specific information 1590 when the private flag 1534 is not set.

The requestor address flag 1536 may indicate whether the discovery TLV 1500 includes the requestor address field 1540. The discovered addresses flag 1537 may indicate whether the discovered addresses information container 1580 is present in the discovery TLV 1500.

The requestor address field 1540 may indicate an address of a device requesting discovery information contained in the TLV 1500. The requestor address field 1540 shown in FIG. 15 is six octets long. In some implementations, the requestor address field 1540 may be four, eight, or twelve octets long. In some embodiments, the requestor address field 1540 may be a variable length. The requestor address field 1540 may include, for example, a MAC address. In some embodiments, the requestor address field 1540 may include multiple requestor addresses. For example, the requestor address field 1540 may include a requestor address length field and a plurality of requestor addresses. The requestor address field 1540 may include additional fields, and fields may be rearranged, removed, and/or resized. In an embodiment, a single discovery frame may include multiple TLVs 1500, each carrying a different requestor address field 1540.

The ranging information container 1560 may indicate ranging information. The ranging information container 1560 shown in FIG. 15 is a variable length. In some implementations, ranging information container 1560 may be two, six, or eight octets long. The ranging information container 1560 may include one or more of a range information length field, a range control field, and a ranging information field. The ranging information container 1560 may include additional fields, and fields may be rearranged, removed, and/or resized.

The range information length field may indicate a length of the ranging information field. The range information length field may be one octet long. In an embodiment, the ranging information length field may be zero (or another predetermined token value) and the ranging information field may be omitted. The range control field may indicate a ranging algorithm type. The range control field may be one octet long. The range control field may include additional fields, and fields may be rearranged, removed, and/or resized. The ranging information field may be used to indicate ranging information such as, for example, a ranging algorithm identification, ranging data, etc. The ranging information field may be a variable length. In some implementations, the ranging information field may be one, five, or twelve octets long.

The service-specific information container 1570 may encapsulate one or more additional data fields related to an applicable service. The service-specific information container 1570 is a variable length. In some implementations, the service-specific information container 1570 may be one, five, or twelve octets long.

In the illustrated embodiment, the service-specific information container 1570 includes a service-specific information length field 1585 and a service-specific information field 1590. The service-specific information length field 1585 may indicate the length of the service-specific information field 1590. The illustrated service-specific information length field 1585 is one octet long. In some implementations, the service-specific information length field 1585 may be two, five, or twelve octets long. In an embodiment, the service-specific information length field may be zero (or another predetermined token value) and the service-specific information field may be omitted.

The illustrated service-specific information field 1590 is a variable length. In some implementations, the service-specific information field 1590 may be one, five, or twelve octets long. The service-specific information field 1590 includes zero or more length-value pairs, each including a one octet length field 1592a-1592n and a variable-length value field 1594a-1594n. In various embodiments, each length field 1592a-1592n may be two, five, or twelve octets long. In various embodiments, each value field 1594a-1594n may be one, five, or twelve octets long. Each length field 1592a-1592n may indicate the length of the following value field 1594a-1594n. Each value field 1594a-1594n may include additional information fields, which may be related to a specific application in the NAN.

The discovered addresses information container 1580 may indicate one or more addresses of devices that have been discovered by the transmitting device 202 (FIG. 2). The discovered addresses information container 1580 shown in FIG. 15 is a variable length. In some implementations, the discovered addresses information container 1580 may be one, five, or twelve octets long. The discovered address information container 1580 is described in greater detail above with respect to FIG. 14.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element may precede the second element in some manner. Also, unless stated otherwise a set of elements may include one or more elements.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions do not cause a departure from the scope of the present disclosure.

The various illustrative logical blocks, modules, and circuits described in connection with the aspects disclosed herein and in connection with FIGS. 1-15 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above may also be included within the scope of computer-readable media. Additionally, the operations of a method or algorithm may reside as one or any combination or set of codes and instructions on a machine readable medium and computer-readable medium, which may be incorporated into a computer program product.

Any specific order or hierarchy of steps in any disclosed process is an example of a sample approach. Based upon design preferences, the specific order or hierarchy of steps in the processes may be rearranged while remaining within the scope of the present disclosure. The accompanying method claims present elements of the various steps in a sample order, and are not limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this may not require that such operations be performed in the particular order shown or in sequential order, or that all illustrated operations be performed, to achieve desirable results. In certain circumstances, multitasking and parallel processing may be advantageous. Moreover, the separation of various system components in the implementations described above may not require such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. A method for communicating in a wireless neighborhood aware network (NAN), comprising:

31 generating, by a first wireless device, a public action discovery frame comprising one or more type length value (TLV) fields, each of the one or more TLV fields comprising:
a service identifier associated with a respective service, and
a service-specific information container including data related to the respective service, the data comprising a first length field and a service-specific information field; and transmitting, by the wireless device, the public action discovery frame;
wherein at least one of the one or more TLV fields includes a ranging control field comprising at least one of a ranging information length or a ranging algorithm type.

2. The method of claim 1, wherein at least one of the one or more TLV fields includes a private flag indicating whether a respective service-specific information container is parseable.

3. The method of claim 2, wherein the private flag is included in a service control field of a respective TLV field.

4. The method of claim 1, wherein at least one of the one or more TLV fields includes a requestor address.

5. The method of claim 1, wherein the one or more TLV fields include a requestor address flag indicating whether a requestor address is included in the one or more TLV fields.

6. The method of claim 1, wherein at least one of the one or more TLV fields includes a connection setup information element.

7. The method of claim 1, wherein at least one of the one or more TLV fields includes at least one of a second length field, a service control field, a range control field, or a ranging information field.

8. The method of claim 1, wherein at least one of the one or more TLV fields includes a service control field comprising at least one of a publish flag, a subscribe flag, a secure flag, or a range limited flag.

9. The method of claim 1, wherein at least one service identifier included in the one or more TLV fields comprises all-ones or all-zeroes and indicates a NAN management operation.

10. The method of claim 1, wherein the public action discovery frame further comprises a source address comprising an identifier of the wireless device.

11. The method of claim 1, wherein the public action discovery frame further comprises a destination address that is the same as a Basic Service Set Identifier (BSSID) of the NAN.

12. The method of claim 6, wherein the connection setup information element indicates WiFi direct connection establishment.

13. The method of claim 1, wherein transmitting the public action discovery frame comprises transmitting the public action discovery frame during a discovery window associated with the NAN.

14. A wireless device configured to communicate in a wireless neighborhood aware network (NAN), comprising:
a processor configured to:
generate a public action discovery frame comprising one or more type length value (TLV) fields, each of the one or more TLV fields comprising:
a service identifier associated with a respective service, and
a service-specific information container including data related to the respective service, the data comprising a first length field and a service-specific information field; and

32 a transmitter configured to transmit, at the wireless device, the public action discovery frame;
wherein at least one of the one or more TLV fields includes a ranging control field comprising at least one of a ranging information length or a ranging algorithm type.

15. The wireless device of claim 14, wherein at least one of the one or more TLV fields includes a private flag indicating whether a respective service-specific information container is parseable.

16. The wireless device of claim 15, wherein the private flag is included in a service control field of a respective TLV field.

17. The wireless device of claim 14, wherein at least one of the one or more TLV fields includes a requestor address.

18. The wireless device of claim 14, wherein at least one of the one or more TLV fields includes a requestor address flag indicating whether a requestor address is included in the one or more TLV fields.

19. The wireless device of claim 14, wherein at least one of the one or more TLV fields includes a connection setup information element.

20. The wireless device of claim 14, wherein at least one of the one or more TLV fields includes at least one of a second length field, a service control field, a range control field, or a ranging information field.

21. The wireless device of claim 14, wherein at least one of the one or more TLV fields includes a service control field comprising at least one of a publish flag, a subscribe flag, a secure flag, or a range limited flag.

22. The wireless device of claim 14, wherein at least one service identifier included in the one or more TLV fields comprises all-ones or all-zeroes and indicates a NAN management operation.

23. The wireless device of claim 14, wherein the public action discovery frame further comprises a source address comprising an identifier of the wireless device.

24. The wireless device of claim 14, wherein the public action discovery frame further comprises a destination address that is the same as a Basic Service Set Identifier (BSSID) of the NAN.

25. The wireless device of claim 19, wherein the connection setup information element indicates WiFi direct connection establishment.

26. The wireless device of claim 14, wherein the transmitter is configured to transmit the public action discovery frame during a discovery window associated with the NAN.

27. An apparatus for communicating in a wireless neighborhood aware network (NAN), comprising:
means for generating, by a first wireless device, a public action discovery frame comprising one or more type length value (TLV) fields, each of the one or more TLV fields comprising:
a service identifier associated with a respective service, and
a service-specific information container including data related to the respective service, the data comprising a first length field and a service-specific information field; means for transmitting, at the first wireless device, the public action discovery frame;
wherein at least one of the one or more TLV fields includes a ranging control field comprising at least one of a ranging information length or a ranging algorithm type.

28. A non-transitory computer-readable medium comprising code that, when executed, causes an apparatus to:

generate, at a first wireless device, a public action discovery frame comprising one or more type length value (TLV) fields, each of the one or more TLV fields comprising:
- a service identifier associated with a respective service, and
- a service-specific information container including data related to the respective service, the data comprising a first length field and a service-specific information field; and transmit, at the first wireless device, the public action discovery frame;

wherein at least one of the one or more TLV fields includes a ranging control field comprising at least one of a ranging information length or a ranging algorithm type.

* * * * *